US012615573B2

(12) United States Patent
Zhu et al.

(10) Patent No.: US 12,615,573 B2
(45) Date of Patent: Apr. 28, 2026

(54) LOSSLESS DATA TRANSMISSION COMMUNICATION METHOD, APPARATUS, AND SYSTEM

(71) Applicant: HUAWEI TECHNOLOGIES CO., LTD., Guangdong (CN)

(72) Inventors: Yuanping Zhu, Shanghai (CN); Yulong Shi, Beijing (CN); Zhenzhen Cao, Boulogne Billancourt (FR)

(73) Assignee: Huawei Technologies Co., LTD., Shenzhen (CN)

( * ) Notice: Subject to any disclaimer, the term of this patent is extended or adjusted under 35 U.S.C. 154(b) by 375 days.

(21) Appl. No.: 18/192,374

(22) Filed: Mar. 29, 2023

(65) Prior Publication Data

US 2023/0247521 A1     Aug. 3, 2023

Related U.S. Application Data

(63) Continuation of application No. PCT/CN2020/119118, filed on Sep. 29, 2020.

(51) Int. Cl.
*H04W 40/24*     (2009.01)
(52) U.S. Cl.
CPC ................................. *H04W 40/248* (2013.01)
(58) Field of Classification Search
CPC ............ H04L 61/5007; H04W 84/047; H04W 40/248
See application file for complete search history.

(56) References Cited

U.S. PATENT DOCUMENTS

| | | | | |
|---|---|---|---|---|
| 11,375,557 B2 * | 6/2022 | Mildh | ................. | H04L 61/5014 |
| 2020/0245223 A1 | 7/2020 | Cheng et al. | | |
| 2021/0168667 A1 * | 6/2021 | Byun | ................. | H04W 36/0011 |
| 2021/0315030 A1 * | 10/2021 | Teyeb | ................. | H04L 61/5076 |
| 2022/0166703 A1 * | 5/2022 | Xu | ........................... | H04L 61/50 |

FOREIGN PATENT DOCUMENTS

| | | |
|---|---|---|
| CN | 110536350 A | 12/2019 |
| CN | 111586744 A | 8/2020 |
| CN | 114071599 A | 2/2022 |

(Continued)

OTHER PUBLICATIONS

Notice of Allowance in Japanese Appln. No. 2023-519422, mailed on Jan. 21, 2025, 5 pages (with English translation).

(Continued)

*Primary Examiner* — Shukri Taha
(74) *Attorney, Agent, or Firm* — Fish & Richardson P.C.

(57) ABSTRACT

Embodiments of this application provide a lossless data transmission communication method, apparatus, and system. The method includes: A first network node determines a first data packet. A destination node of the first data packet is a third network node or a security gateway on the third network node side. The third network node is a source donor node or a source donor node central unit (CU) of the first network node. The first network node sends the first data packet to a second network node. The second network node is a target donor node distributed unit DU of the first network node. According to the method, a data packet loss in a topology update process of the first network node can be avoided, and service continuity can be ensured.

20 Claims, 12 Drawing Sheets

(56)                     References Cited

FOREIGN PATENT DOCUMENTS

| EP | 3920449 | A1 | 12/2021 |
|---|---|---|---|
| EP | 3927009 | A1 | 12/2021 |
| WO | 2010127706 | A1 | 11/2010 |
| WO | 2019001284 | A1 | 1/2019 |
| WO | 2019136891 | A1 | 7/2019 |
| WO | 2019158053 | A1 | 8/2019 |
| WO | 2019240646 | A1 | 12/2019 |
| WO | 2020032127 | A1 | 2/2020 |
| WO | 2020039346 | A1 | 2/2020 |
| WO | 2020066605 | A1 | 4/2020 |
| WO | 2020067736 | A1 | 4/2020 |
| WO | 2020164175 | A1 | 8/2020 |
| WO | 2020167186 | A1 | 8/2020 |

OTHER PUBLICATIONS

Samsung, "Discussion on Service Interruption Reduction in IAB," 3GPP TSG RAN WG3#109-e, R3-205412, Online, Aug. 17-28, 2020, 4 pages.
Office Action in Japanese Appln. No. 2023-519422, mailed on Apr. 2, 2024, 5 pages (with English translation).
Huawei, "Routing in IAB network," 3GPP TSG-RAN WG3 meeting #106, R3-196992, Reno, NV, USA, Nov. 18-22, 2019, 8 pages.
3GPP TR 38.874 V16.0.0, "3rd Generation Partnership Project; Technical Specification Group Radio Access Network; NR; Study on Integrated Access and Backhaul; (Release 16)," Dec. 2018, 111 pages.
Huawei, "(TP for NR_IAB BL CR for TS 38.401): Intra IAB donor-CU topology adaptation procedure," 3GPP TSG-RAN WG3 Meeting #106, R3-196994, Reno, USA, Nov. 18-22, 2019, 5 pages.
Nokia (moderator), "Summary of Offline Discussion on CB: # 8 Topology Redundancy," 3GPP TSG-RAN WG3 #108-e, R3-205468, Online, Jun. 1-11, 2020, 18 pages.
3GPP TS 38.401 V16.2.0, "3rd Generation Partnership Project; Technical Specification Group Radio Access Network; NG-RAN; Architecture description (Release 16)," Jul. 2020, 77 pages.
3GPP TS 38.423 V16.2.0, "3rd Generation Partnership Project; Technical Specification Group Radio Access Network; NG-RAN; Xn application protocol (XnAP) (Release 16)," Jul. 2020, 447 pages.
3GPP TS 38.473 V16.2.0, "3rd Generation Partnership Project; Technical Specification Group Radio Access Network; NG-RAN; F1 application protocol (F1AP) (Release 16)," Jul. 2020, 363 pages.
3GPP TS 38.300 V16.2.0, "3rd Generation Partnership Project; Technical Specification Group Radio Access Network; NR; NR and NG-RAN Overall Description; Stage 2 (Release 16)," Jul. 2020, 148 pages.
Office Action in Australian Appln. No. 2020470490, mailed on Dec. 18, 2023, 3 pages.
Extended European Search Report in European Appln No. 20955617.4, dated Sep. 28, 2023, 14 pages.
International Search Report and Written Opinion in International Appln. No. PCT/CN2020/119118, mailed on Jun. 25, 2021, 22 pages (with English translation).
Office Action in Australian Appln. No. 2020470490, mailed on Jun. 25, 2024, 4 pages.

* cited by examiner

LOSSLESS DATA TRANSMISSION COMMUNICATION METHOD, APPARATUS, AND SYSTEM

CROSS-REFERENCE TO RELATED APPLICATIONS

This application is a continuation of International Application No. PCT/CN2020/119118, filed on Sep. 29, 2020, the disclosure of which is hereby incorporated by reference in its entirety.

TECHNICAL FIELD

Embodiments of this application relate to the field of communication technologies, and in particular, to a lossless data transmission communication method, apparatus, and system.

BACKGROUND

5th generation (5G) mobile communication comprehensively raises stricter requirements on various network performance indicators. For example, 5G mobile communication requires 1000 times of increase in capacity indicators, wider coverage, and ultra-high reliability and an ultra-low latency. In consideration of rich frequency resources on high-frequency carriers, networking using high-frequency small cells is increasingly popular in hotspot areas, to meet an ultra-high capacity requirement of 5G. The high-frequency carrier has a poor propagation characteristic, is severely attenuated due to blocking, and has small coverage. Therefore, a large quantity of small cells need to be densely deployed. Correspondingly, it is quite costly to provide fiber backhaul for the large quantity of small cells that are densely deployed, and construction is difficult. Therefore, an economical and convenient backhaul solution is needed. In addition, from the perspective of a wide coverage requirement, it is difficult and costly to deploy optical fibers to provide network coverage in some remote areas. Therefore, a flexible and convenient access and backhaul solution also needs to be designed.

An integrated access and backhaul (integrated access and backhaul, IAB) technology provides a solution to resolve the foregoing two problems. A wireless transmission solution is used for both an access link (access link) and a backhaul link (backhaul link) in the IAB technology, avoiding optical fiber deployment. In an IAB network, a relay node RN (relay node, RN) or an IAB node (IAB node) may provide a wireless access service for user equipment (user equipment, UE). Service data of the UE is transmitted by the IAB node through a wireless backhaul link to a connected donor node (IAB donor) or a donor base station (donor gNodeB, DgNB). An antenna can be shared by using the IAB node for access and backhaul, to reduce a quantity of antennas of a base station.

In a current IAB network, to meet communication requirements in different scenarios, an IAB node may perform a topology update. A topology update usually occurs due to handover or in a process of recovery from radio link failure. However, after the IAB node performs an inter-IAB donor topology update, a data packet loss problem may occur. Therefore, how to reduce a data packet loss in the case that the IAB node performs a topology update process in different IAB donor service ranges becomes a problem that needs to be urgently resolved. It may be understood that a similar problem may also exist in another network architecture.

SUMMARY

Embodiments of this application provide a lossless data transmission communication method, apparatus, and system, to reduce a data packet loss resulting from a topology update, for example, reduce a data packet loss in a topology update process performed by an IAB node in different IAB donor service ranges.

According to a first aspect, an embodiment of this application provides a lossless data transmission communication method. The method may be performed by a network node, or may be performed by a component (such as a processor, a chip, or a chip system) of the network node. The method includes: A second network node receives a first data packet from a first network node. The second network node is a target donor node distributed unit DU of the first network node. A destination node of the first data packet is a third network node or a security gateway on the third network node side. The third network node is a source donor node or a source donor node central unit CU of the first network node. The second network node sends the first data packet to the third network node.

According to the foregoing method, inter-donor DU data packet rerouting and forwarding by an IAB node can be supported. This avoids a data packet loss in a topology update process of the first network node, and reduces impact on uplink service continuity of a terminal served by the first network node.

In a possible manner, the second network node updates an internet protocol IP address filtering rule to send the first data packet to the third network node.

In this manner, the first data packet is not discarded by the second network node.

In a possible manner, that the second network node updates an IP address filtering rule includes:

The second network node obtains a first IP address. The first IP address is one or more IP addresses obtained by the first network node when the first network node is connected to the third network node.

The second network node updates the IP address filtering rule based on the first IP address.

Optionally, the first IP address is one or more IP addresses obtained when the first network node is connected to a source donor DU.

Optionally, the second network node adds the first IP address to a whitelist of a source IP address filtering rule, that is, adds the first IP address to a source IP address list of data packets that are allowed to be forwarded.

In the foregoing manner, the second network node is allowed to forward the first data packet, so that the first data packet is not discarded by the second network node.

In a possible manner, that the second network node obtains a first IP address includes: The second network node receives the first IP address from the third network node.

Optionally, that the second network node obtains a first IP address includes: The second network node receives the first IP address from a fourth network node. The fourth network node is a target donor central unit CU of the first network node.

In the foregoing manner, the second network node may obtain the first IP address of first data, so that the first data packet is not discarded.

In a possible manner, that the second network node updates an IP address filtering rule includes: The second network node receives first suspension indication information from a fourth network node. The first suspension indication information indicates the second network node to suspend the IP address filtering rule. The fourth network node is a target donor CU of the first network node.

In the foregoing manner, the second network node is allowed to forward the first data packet, so that the first data packet is not discarded by the second network node due to the IP address filtering rule.

In a possible manner, the first data packet is encapsulated into a second data packet. The second data packet includes a first IP header and a second IP header. A target IP address of the first IP header is an IP address of the third network node or an IP address of the security gateway on the third network node side. A target IP address of the second IP header is an IP address of the fourth network node. The second network node sends the second data packet to the fourth network node based on the second IP header, so that the fourth network node sends the first data packet to the third network node.

In the foregoing manner, the second network node may send the first data packet to the third network node via the fourth network node. This ensures that the first data packet can be transmitted to the source donor CU, so that the first data packet can be correctly processed by the third network node. The processing is, for example, integrity verification or decryption.

In a possible manner, the second data packet further includes first removal indication information indicating the fourth network node to remove the second IP header.

In the foregoing manner, the fourth network node may identify specific data packets requiring such special processing, to be specific, specific data packets that are forwarded based on an inner IP header after an outer IP header is removed.

In a possible manner, the second IP header is added by the second network node to the first data packet, or the second IP header is added by the first network node to the first data packet.

Optionally, the second IP header is added outside the first IP header, or the second IP header is outside the first IP header.

In the foregoing manner, the first data packet can be forwarded to the fourth network node.

In a possible manner, the first network node completes a topology update before the second network node receives the first data packet from the first network node.

According to a second aspect, an embodiment of this application provides a lossless data transmission communication method. The method may be performed by a network node, or may be performed by a component (for example, a processor, a chip, or a chip system) of the network node. The method includes: A first network node determines a first data packet. A destination node of the first data packet is a third network node or a security gateway on the third network node side. The third network node is a source donor node or a source donor node CU of the first network node. The first network node sends the first data packet to a second network node. The second network node is a target donor node DU of the first network node.

In the foregoing manner, the first network node reroutes, by using the second network node, the first data packet to be sent to the third network node, so that the first data packet can be correctly processed by the third network node. This avoids a data packet loss when the first network node performs a topology update.

In a possible manner, the first network node updates a backhaul adaptation protocol layer configuration of the first data packet to send the first data packet to the second network node.

Optionally, the first network node updates a routing identifier in the first data packet based on configuration information sent by a fourth network node. The fourth network node is a target donor CU of the first network node.

In the foregoing manner, before the first network node forwards the first data packet, the first network node modifies header information of a BAP layer of the first data packet, so that the first data packet can be successfully sent to the second network node.

In a possible manner, the first network node adds a second IP header to the first data packet. A target IP address of the second IP header is an IP address of the fourth network node. The fourth network node is the target donor central unit CU of the first network node.

In the foregoing manner, the first data packet can be forwarded to the fourth network node.

In a possible manner, the first data packet further includes first removal indication information indicating the fourth network node to remove the second IP header.

In the foregoing manner, the fourth network node may identify specific data packets that require such special processing, to be specific, specific data packets forwarded based on an inner IP header after an outer IP header is removed.

In a possible manner, the first network node sends a first IP address to the fourth network node. The first IP address is one or more IP addresses obtained by the first network node when the first network node is connected to the third network node.

In the foregoing manner, it helps the fourth network node obtain the first IP address, and further, the fourth network node sends the first IP address to the second network node.

In a possible manner, before that a first network node determines a first data packet, the first network node performs a topology update.

According to a third aspect, an embodiment of this application provides a lossless data transmission communication method. The method may be performed by a network node, or may be performed by a component (for example, a processor, a chip, or a chip system) of the network node. The method includes:

A fourth network node determines a first message, where the fourth network node is a target donor node CU of a first network node.

The fourth network node sends the first message to a second network node. The first message is used by the second network node to update an IP address filtering rule. The second network node is a target donor node DU of the first network node.

In the foregoing manner, the fourth network node provides, for the second network node, information required for updating the IP address filtering rule.

In a possible manner, that a fourth network node determines a first message includes:

The fourth network node obtains a first IP address. The first IP address is one or more IP addresses obtained by the first network node when the first network node is connected to a third network node. The third network node is a source donor node or a source donor node CU of the first network node. That the fourth network node sends the first message to a second network node includes: The first message includes the first IP address.

Optionally, the fourth network node receives the first IP address from the third network node.

Alternatively, the fourth network node receives the first IP address from the first network node.

Alternatively, the fourth network node receives the first IP address from an access and mobility management function AMF.

In the foregoing manner, the fourth network node provides the first IP address for the second network node, so that the second network node updates the IP address filtering rule based on the first IP address. This further helps ensure successful forwarding of first data.

In a possible manner, that a fourth network node determines a first message includes: The fourth network node determines first suspension indication information. The first suspension indication information indicates the second network node to suspend the IP address filtering rule.

That the fourth network node sends the first message to a second network node includes: The first message includes the first suspension indication information.

In the foregoing manner, the fourth network node indicates the second network node to suspend the IP address filtering rule, so that the first data packet is not discarded by the second network node.

In a possible manner, the fourth network node receives a second data packet from the second network node. The second data packet includes a first IP header and a second IP header. A target IP address of the first IP header is the third network node. A target IP address of the second IP header is an IP address of the fourth network node.

The fourth network node sends the first data packet to the third network node. The first data packet is a data packet obtained by processing the second data packet by the fourth network node. The first data packet does not include the second IP header.

In the foregoing manner, the fourth network node forwards the first data packet to the third network node. This ensures that the first data packet can be correctly processed by the third network node, and avoids a loss of the first data packet.

In a possible manner, the first data packet further includes first removal indication information, indicating the fourth network node to forward the first data packet to the third network node based on the first IP header after removing the second IP header.

In the foregoing manner, the fourth network node can determine specific data packets for which IP header removal processing needs to be performed.

In a possible manner, the fourth network node receives, from the third network node, data that relates to a terminal device served by the first network node and that is in the first data packet.

In the foregoing manner, the fourth network node may obtain the data that relates to the terminal and that is in the first data packet, and may further process the data, for example, send the data of a terminal service to the terminal.

According to a fourth aspect, an embodiment of this application provides a lossless data transmission communication method. The method may be performed by a network node, or may be performed by a component (for example, a processor, a chip, or a chip system) of the network node. The method includes: A third network node obtains a first data packet. The first data packet is a data packet to be sent to the third network node after a first network node is connected to a second network node. The third network node processes the first data packet. The third network node is a source donor node or a source donor node CU of the first network node. The second network node is a target donor node DU of the first network node.

In the foregoing manner, the third network node can obtain the first data packet to be sent by the first network node, and correctly process the first data packet. This helps avoid a loss of the first data packet and impact on terminal service continuity.

In a possible manner, that a third network node obtains a first data packet includes: The third network node receives the first data packet from a fourth network node. The first data packet is a data packet obtained by processing a second data packet from the second network node by the fourth network node. The first data packet is encapsulated into the second data packet.

Alternatively, the third network node receives the first data packet from the second network node.

In the foregoing manner, the third network node can obtain the first data packet through different paths.

In a possible manner, that the third network node processes the first data packet includes: The third network node determines, based on the first data packet, data related to a terminal device served by the first network node.

The third network node sends the data related to the terminal device to the fourth network node.

Optionally, the data related to the terminal device is a packet data convergence protocol PDCP service data unit SDU of the terminal device.

In the foregoing manner, the third network node can correctly process the first data packet, and service continuity of the terminal device is ensured.

According to a fifth aspect, an embodiment of this application provides a lossless data transmission communication method. The method may be performed by a network node, or may be performed by a component (for example, a processor, a chip, or a chip system) of the network node. The method includes: A first network node receives a first handover command from a third network node. The first handover command indicates the first network node to perform handover. The third network node is a source donor node or a source donor node CU of the first network node. The first network node sends first transmission completion indication information. The first transmission completion indication information indicates that transmission of a third data packet is completed. The third data packet includes uplink data from the first network node and a descendent node of the first network node. The descendent node includes a descendent network node and/or a descendent terminal.

Optionally, the method further includes: The first network node performs the handover.

Optionally, in another possible manner, the first network node determines to perform a topology update. The first network node sends first transmission completion indication information. The first transmission completion indication information indicates that transmission of a third data packet is completed. The third data packet includes uplink data from the first network node and a descendent node of the first network node. The descendent node includes a descendent network node and/or a descendent terminal. Optionally, the method further includes: The first network node performs the topology update.

Optionally, that the first network node sends first transmission completion indication information includes:

The first network node sends the first transmission completion indication information to the third network node.

Optionally, that the first network node sends first transmission completion indication information includes:

The first network node sends the first transmission completion indication information to a fifth network node. The fifth network node provides access and backhaul services for the first network node.

In the foregoing manner, the first network node does not perform the topology update until it is ensured that all in-transit uplink data packets that are buffered by the first network node and the descendent node of the first network node are sent to a source parent node of the first network node and the first transmission completion indication information is sent to the source parent node or the source donor node. This ensures that no data packet is lost in a topology update process.

In a possible manner, the first network node sends the third data packet to the third network node.

In the foregoing manner, after determining to perform the topology update, the first network node sends the third data packet to the third network node, and performs the topology update only after determining that all the third data packets are transmitted.

In a possible manner, the first network node stops uplink scheduling for a sixth network node. The sixth network node is the descendent network node of the first network node.

Optionally, stopping the uplink scheduling for the sixth network node includes: The first network node receives, from the sixth network node, second transmission completion indication information indicating that transmission of a fourth data packet is completed, where the fourth data packet includes uplink data from the sixth network node and a descendent node of the sixth network node; and the first network node stops, based on the second transmission completion indication information, the uplink scheduling for the sixth network node.

Optionally, stopping the uplink scheduling for the sixth network node includes: The first network node receives first scheduling stop indication information from the third network node; and the first network node stops the uplink scheduling for the sixth network node based on the first scheduling stop indication information.

In the foregoing manner, after the first network node determines to perform the topology update and transmission of an uplink data packet on the sixth network node is completed, the first network node stops the uplink scheduling for the sixth network node.

In a possible manner, after the first network node receives the first handover command from a third network node, the method further includes: The first network node stops uplink scheduling for a terminal device, and the first network node provides access and backhaul services for the terminal device.

Optionally, after the first network node determines to perform the topology update, the first network node stops the uplink scheduling for the terminal device, and the first network node provides the access and backhaul services for the terminal device.

In the foregoing manner, after receiving the handover command or determining to perform the topology update, the first network node stops the uplink scheduling for the terminal device. In a possible manner, the first transmission completion indication information is carried in the third data packet, or the first transmission completion indication information is carried in a control protocol data unit PDU at a backhaul adaptation protocol BAP layer.

In the foregoing manner, the first transmission completion indication information may be sent together with a last data packet in the third data packets, or may be sent independently.

According to a sixth aspect, an embodiment of this application provides a lossless data transmission communication method. The method may be performed by a network node, or may be performed by a component (for example, a processor, a chip, or a chip system) of the network node. The method includes: A fifth network node receives transmission indication information indicating to stop uplink scheduling for a first network node. The fifth network node provides access and backhaul services for the first network node. The fifth network node determines, based on the transmission indication information, to stop the uplink scheduling for the first network node.

Optionally, that a fifth network node receives transmission indication information includes: The fifth network node receives first transmission completion indication information from the first network node. The first transmission completion indication information indicates that transmission of a third data packet is completed. The third data packet includes uplink data from the first network node and a descendent node of the first network node. The descendent node includes a descendent network node and/or a descendent terminal. The fifth network node determines, based on the first transmission completion indication information, to stop the uplink scheduling for the first network node.

Optionally, that a fifth network node receives transmission indication information includes: The fifth network node receives second scheduling stop indication information from a third network node. The third network node is a source donor node or a source donor node CU of the first network node.

In the foregoing manner, the fifth network node may receive, in a plurality of manners, transmission completion indication information sent by different network elements, and the fifth network node determines, based on the transmission completion indication information, to stop the uplink scheduling for the first network node.

In a possible manner, the second scheduling stop indication information is included in a second handover command, and the second handover command indicates the fifth network node to perform handover.

In the foregoing manner, when the fifth network node is indicated to perform the handover, the uplink scheduling for the first network node is also indicated to be stopped.

According to a seventh aspect, an embodiment of this application provides a lossless data transmission communication method. The method may be performed by a network node, or may be performed by a component (for example, a processor, a chip, or a chip system) of the network node. The method includes: A third network node receives first transmission completion indication information from a first network node. The first transmission completion indication information indicates that transmission of a third data packet is completed. The third data packet includes uplink data from the first network node and a descendent node of the first network node. The descendent node includes a descendent network node and/or a descendent terminal.

The third network node sends second scheduling stop indication information to a fifth network node. The second scheduling stop indication information indicates the fifth network node to stop uplink scheduling for the first network node. The fifth network node provides access and backhaul services for the first network node.

Optionally, the first transmission completion indication information is carried in the uplink data, or the first transmission completion indication information is carried in an RRC message or an F1AP message.

Optionally, the second scheduling stop indication information is included in a second handover command, and the second handover command indicates the fifth network node to perform handover.

In the foregoing manner, after the third network node determines that transmission of all uplink data on the first network node that performs a topology update is completed, the fifth network node is indicated to stop the uplink scheduling for the first network node. This avoids a data packet loss in a topology update process of the first network node.

According to an eighth aspect, an embodiment of this application provides a lossless data transmission communication apparatus. The apparatus may be a network node, or may be a chip used in the network node. The apparatus has functions of implementing any one of the first aspect to the seventh aspect or the possible implementations of the first aspect to the seventh aspect. The functions may be implemented by hardware, or may be implemented by hardware executing corresponding software. The hardware or software includes one or more modules corresponding to the functions.

According to a ninth aspect, an embodiment of this application provides a lossless data transmission communication apparatus, including a processor and a memory. The memory is configured to store computer-executable instructions. When the apparatus runs, the processor executes the computer-executable instructions stored in the memory, so that the apparatus performs any method in the first aspect to the seventh aspect or the possible implementations of the first aspect to the seventh aspect.

According to a tenth aspect, an embodiment of this application provides a lossless data transmission communication apparatus, including units or means (means) configured to perform the steps of any method in the first aspect to the seventh aspect or the possible implementations of the first aspect to the seventh aspect.

According to an eleventh aspect, an embodiment of this application provides a lossless data transmission communication apparatus, including a processor and an interface circuit. The processor is configured to: communicate with another apparatus through the interface circuit, and perform any method in the first aspect to the seventh aspect or the possible implementations of the first aspect to the seventh aspect. There are one or more processors.

According to a twelfth aspect, an embodiment of this application provides a lossless data transmission communication apparatus, including a processor. The processor is configured to: be connected to a memory, and invoke a program stored in the memory, to perform any method in the first aspect to the seventh aspect or the possible implementations of the first aspect to the seventh aspect. The memory may be located inside or outside the apparatus. There are one or more processors.

According to a thirteenth aspect, an embodiment of this application further provides a computer-readable storage medium storing instructions. When the instructions are run on a computer, a processor is enabled to perform any method in the first aspect to the seventh aspect or the possible implementations of the first aspect to the seventh aspect.

According to a fourteenth aspect, an embodiment of this application further provides a computer program product. The computer product includes a computer program. When the computer program is run, any method in the first aspect to the seventh aspect or the possible implementations of the first aspect to the seventh aspect is enabled to be performed.

According to a fifteenth aspect, an embodiment of this application further provides a chip system, including a processor. The processor is configured to perform any method in the first aspect to the seventh aspect or the possible implementations of the first aspect to the seventh aspect.

DESCRIPTION OF EMBODIMENTS

Embodiments of this application provide a lossless data transmission communication method and apparatus. The method and the apparatus are based on a same concept. Because principles for resolving a problem by using the method and the apparatus are similar, mutual reference may be made between implementations of the apparatus and the method, and repeated descriptions are omitted.

In descriptions of embodiments of this application, the term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects. In this application, "at least one" means one or more, and "a plurality of" means two or more. In addition, it can be understood that in descriptions of this application, terms such as "first" and "second" are merely used for distinguishing and description, but should not be understood as indicating or implying relative importance, or should not be understood as indicating or implying a sequence.

The lossless data transmission communication method provided in embodiments of this application may be applied to a 4th generation (4th generation, 4G) communication system, for example, a long term evolution (long term evolution, LTE) system; may be applied to a 5th generation (5th generation, 5G) communication system, for example, a 5G new radio (new radio, NR) system; or may be applied to various future communication systems, for example, a 6th generation (6th generation, 6G) communication system, and for another example, a 7th generation (7th generation, 7G) communication system. Embodiments of this application may also be applied to an integrated access and backhaul (integrated access and backhaul, IAB) scenario.

The following describes embodiments of this application with reference to the accompanying drawings. Features or content marked by dashed lines in the accompanying drawings may be understood as optional operations or optional structures in embodiments of this application.

Figure 1A:
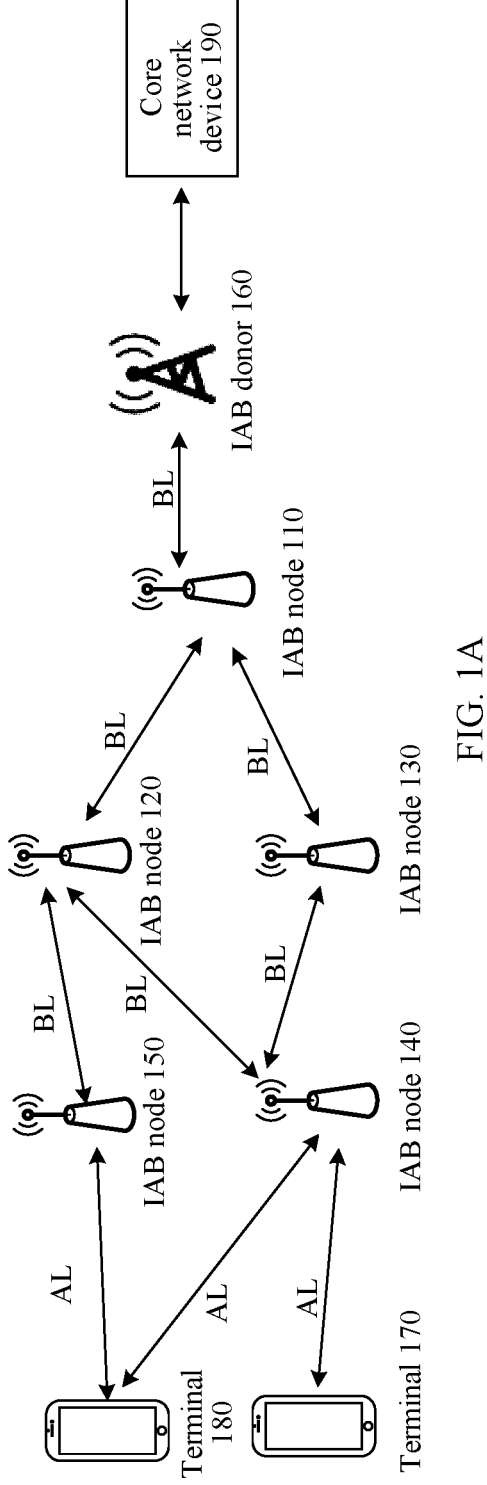
FIG. 1A is a schematic diagram of a communication system to which an embodiment of this application is applicable.

FIG. 1A is a schematic diagram of a communication system to which an embodiment of this application is applicable. The communication system 100 includes at least one IAB node (an IAB node 110 to an IAB node 150 are shown in the figure) and at least one IAB donor 160. Optionally, the communication system further includes at least one terminal (a terminal 170 and a terminal 180 are shown in the figure) connected to the IAB node. Optionally, the communication system further includes a core network device 190 connected to the IAB donor 160. The IAB node 140 may provide a wireless access service for the terminal 170 through an access link (access link, AL). Service data of the terminal 170 may be transmitted by the IAB node 140 to the connected IAB donor 160 through a wireless backhaul link (backhaul link, BL).

The terminal in FIG. 1A may be user equipment, a mobile termination (mobile termination, MT), an access terminal device, a subscriber unit, a subscriber station, a mobile station, a remote station, a remote terminal device, a mobile device, a user terminal device, a wireless terminal device, a user agent, a user apparatus, or the like. The terminal may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device (such as a smart watch or a smart band), smart furniture or a home appliance, a terminal device in a 5G network, a terminal device in a future evolved public land mobile communication network (public land mobile network, PLMN), a vehicle device in vehicle-to-everything (vehicle-to-everything, V2X), customer premises equipment (customer premises equipment, CPE), or the like. A specific implementation form of the user equipment is not limited in this application.

The IAB node in FIG. 1A may include a mobile termination and a distributed unit DU (distributed unit, DU). When facing a parent node of the IAB node, the IAB node may be considered as a terminal device, that is, the role of an MT. When facing a descendent device of the IAB node (where the descendent device may be another child IAB node or common UE), the IAB node may be considered as a network device, that is, the role of a DU. For ease of description, in embodiments of this application, an IAB node (for example, the IAB node 140) or a terminal (for example, the terminal 170) that is connected to the IAB donor 160 via the IAB node 130 is referred to as a descendent IAB node (descendent IAB node), a descendent node, a descendent network node, or a descendent terminal of the IAB node 130.

Figure 1B:
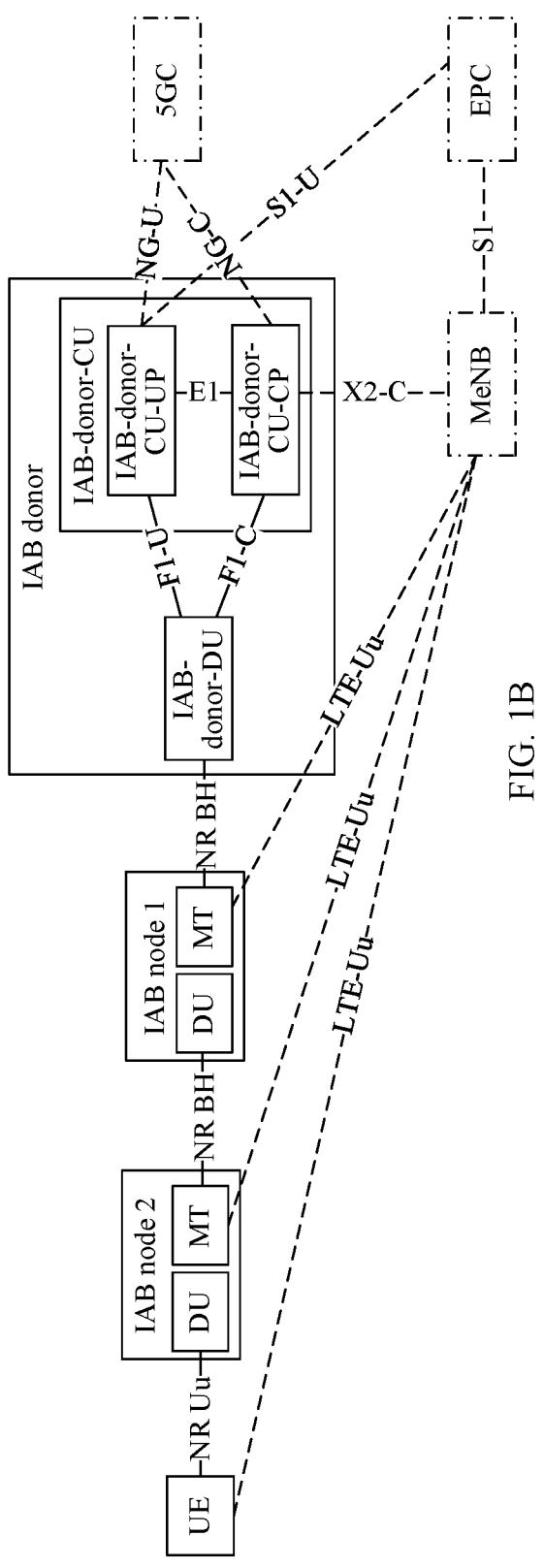
FIG. 1B is a schematic diagram of an architecture of an IAB network system according to an embodiment of this application.

An IAB donor (IAB donor) in FIG. 1A may be a donor base station, and the IAB donor may be referred to as a DgNB (a donor gNodeB) for short in a 5G network. The IAB donor may be a complete entity, or may exist in a form in which a central unit (central unit, CU) (which may be referred to as a donor-CU, a CU, or a gNB-CU for short for ease of description in this application) and a distributed unit (distributed unit, DU) (which is referred to as a donor-DU, a DU, or a gNB-DU for short in this application) are separated. As shown in FIG. 1B, the IAB donor may be a gNB in a 5G radio access network (5G radio access network, 5G RAN). The IAB donor may include a gNB-CU and a gNB-DU. The gNB-CU and the gNB-DU are connected through an F1 interface, and the F1 interface may further include a control plane interface (F1-C) and a user plane interface (F1-U). The CU and a core network are connected through a next generation (next generation, NG) interface. The gNB-CU or the donor-CU may alternatively exist in a form in which a user plane (user plane, UP) (referred to as a CU-UP for short in this application) and a control plane (control plane, CP) (referred to as a CU-CP for short in this application) are separated. In other words, the gNB-CU or the donor-CU includes the CU-CP and the CU-UP. A gNB-CU may include one gNB-CU-CP and at least one gNB-CU-UP. Alternatively, a donor-CU may include one donor-CU-CP and at least one donor-CU-UP.

It is easy to understand that the IAB node and the IAB donor in embodiments of this application may be referred to as a network node or a network device.

The core network device in FIG. 1A may be a network management device, for example, an operation, administration and maintenance (operation, administration and maintenance, OAM) network element. The network management device may include an element management system (element management system, EMS) and a network management system (network management system, NMS). As shown in FIG. 1B, the network management device may be a function network element in a next generation core (Next Generation Core, NGC) or a 5G core (5G core, 5GC). Alternatively, the network management device may be a function network element deployed in a backbone network behind the 5GC, or the network management device may be deployed at another location. A specific deployment location of the network management device is not limited in this application.

As shown in FIG. 1B, an IAB node is connected to a core network through an IAB donor. For example, in a standalone (standalone, SA) 5G architecture, the IAB node is connected to a 5GC via an IAB donor. An IAB-donor-CU-CP is connected to a control plane network element (for example, an access and mobility management function (access and mobility management function, AMF)) in the 5GC through an NG control plane interface. The IAB-donor-CU-UP is connected to a user plane network element (for example, a user plane function (user plane function, UPF)) in the 5GC through an NG user plane interface. In a 5G architecture (for example, a non-standalone (non-standalone, NSA) networking scenario or an NR-NR DC scenario) of dual connectivity (dual connectivity, DC) or multi-connectivity (multi-connectivity, MC), on a primary path, the IAB node may be connected to an evolved packet core (evolved packet core, EPC) (for example, connected to a serving gateway (serving gateway, SGW)) via an evolved base station (evolved NodeB, eNB). There is an LTE Uu air interface connection between an MeNB and an MT of the IAB node. There is an X2-C interface between the MeNB and the IAB-donor-CU-CP. The MeNB is connected to the EPC through an S1 interface (including an S1 interface user plane and an S1 interface control plane). A 5G core network may be configured to perform authentication, mobility management, protocol data unit (protocol data unit, PDU) session management, and the like on a terminal device, and includes functional entities or network elements such as an AMF and a UPF. A 4G core network may be configured to perform authentication, mobility management, packet data network connection management, and the like on the terminal device, and includes network elements such as a mobility management entity and a packet data gateway.

To ensure service transmission reliability, in an IAB network, multi-hop IAB node networking and multi-connectivity IAB node networking are supported. Therefore, there may be a plurality of transmission paths between a terminal and an IAB donor. On one path, there is a determined hierarchical relationship between IAB nodes, and between an IAB node and an IAB donor connected to the IAB node. Each IAB node considers, as a parent node, a node providing a backhaul service for the IAB node. Correspondingly, each IAB node may be considered as a child node of the parent node of the IAB node.

For example, refer to FIG. 1A. A parent node of the IAB node 110 is the IAB donor 160, the IAB node 110 is a parent node of the IAB node 120 and the IAB node 130, both the IAB node 120 and the IAB node 130 are parent nodes of the IAB node 140, and a parent node of the IAB node 150 is the IAB node 120. An uplink data packet of the terminal may be transmitted to the IAB donor through one or more IAB nodes, and then is sent by the IAB donor to the core network device 190 (for example, a user plane function (user plane function, UPF) network element in a 5G network). After the IAB donor 160 receives a downlink data packet from the core network device (for example, a mobile gateway device), the IAB donor sends the downlink data packet to the terminal through the one or more IAB nodes. There are two available paths for data packet transmission between the terminal 170 and the IAB donor 160. One path is as follows: the terminal 170→the IAB node 140→the IAB node 130→the IAB node 110→the IAB donor 160. The other path is as follows: the terminal 170→the IAB node 140→the IAB node 120→the IAB node 110→the IAB donor 160. There are three available paths for data packet transmission between the terminal 180 and the IAB donor 160. The three paths are as follows: the terminal 180→the IAB node 140→the IAB node 130→the IAB node 110→the IAB donor 160; the terminal 180→the IAB node 140→the IAB node 120→the IAB node 110→the IAB donor 160; and the terminal 180→the IAB node 150→the IAB node 120→the IAB node 110→the IAB donor 160. Each intermediate IAB node on an uplink path from an IAB node to the IAB donor may be referred to as an upstream node of the IAB node. For example, both the IAB node 110 and the IAB node 120 in FIG. 1A may be referred to as upstream IAB nodes of the IAB node 150. For example, a descendent device or a descendent node of the IAB node may include a device directly accessing the IAB node, for example, a child node of the IAB node or UE accessing the IAB node. For example, the IAB node 120 and the IAB node 130 in FIG. 1A are referred to as descendent devices of the IAB node 110, and the terminal 170 and the terminal 180 may be referred to as descendent devices of the IAB node 140.

It may be understood that, in the IAB network, there may be one or more IAB nodes on a transmission path between the terminal and the IAB donor. Each IAB node needs to maintain a wireless backhaul link to a parent node, and further needs to maintain a radio link to a child node. If an IAB node is a node accessed by the terminal, a radio access link AL exists between the IAB node and a child node (namely, the terminal). If an IAB node is a node that provides a backhaul service for another IAB node, a wireless backhaul link BL exists between the IAB node and a child node (namely, the another IAB node). For example, refer to FIG. 1A. On the path "the terminal 170→the IAB node 140→the IAB node 130→the IAB node 110→the IAB donor 160", the terminal 170 accesses the IAB node 140 through a wireless access link, the IAB node 140 accesses the IAB node 130 through a wireless backhaul link, the IAB node 130 accesses the IAB node 110 through a wireless backhaul link, and the IAB node 110 accesses the IAB donor through a wireless backhaul link.

The foregoing IAB networking scenario is merely an example. In an IAB scenario with multi-hop and multi-connectivity combined, there are more other possible IAB networking scenarios. For example, an IAB donor and an IAB node connected to another IAB donor form dual connectivity to serve a terminal. The possible IAB networking scenarios are not listed one by one herein.

Figure 1C:
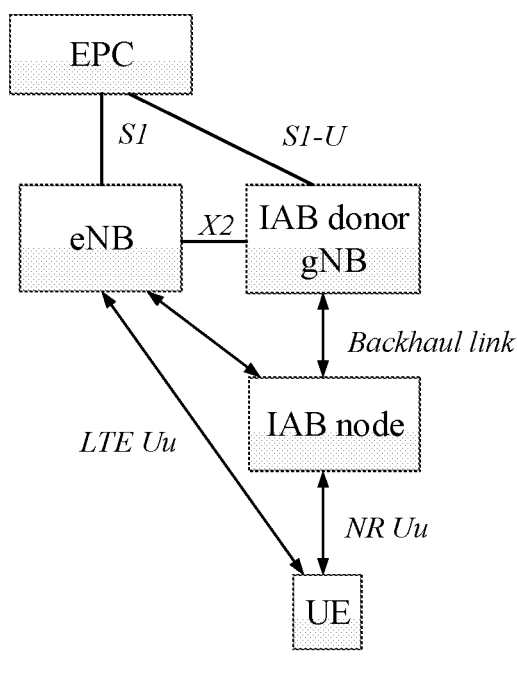
FIG. 1C is a schematic diagram of a non-standalone networking IAB scenario according to an embodiment of this application.

The IAB network also supports non-standalone (non-standalone, NSA) networking, which is also referred to as an EN-DC (E-UTRAN NR dual connectivity) networking scenario. FIG. 1C is a schematic diagram of a non-standalone networking IAB scenario according to an embodiment of this application. An IAB node supports 4G and 5G network dual connectivity. An LTE base station eNB is a master base station (master eNB, MeNB), provides an LTE air interface (LTE Uu) connection for the IAB node, and establishes an S1 interface with a 4G core network evolved packet core (evolved packet core, EPC) for user plane and control plane transmission. An IAB donor gNB is a secondary base station, provides an NR air interface (NR Uu) connection for the IAB node, and establishes an S1 interface with the core network EPC for user plane transmission. Similarly, UE also supports EN-DC. The UE is connected to a master base station eNB through an LTE Uu interface, and is connected to a secondary base station IAB node through an NR Uu interface. The secondary base station of the UE may alternatively be an IAB donor gNB.

It is easy to understand that FIG. 1C is merely a networking example. An NSA scenario of an IAB network also supports multi-hop IAB networking. For example, the UE in FIG. 1C may be another IAB node, in other words, the IAB node may be connected to the IAB donor gNB through a multi-hop wireless backhaul link.

Figure 1D:
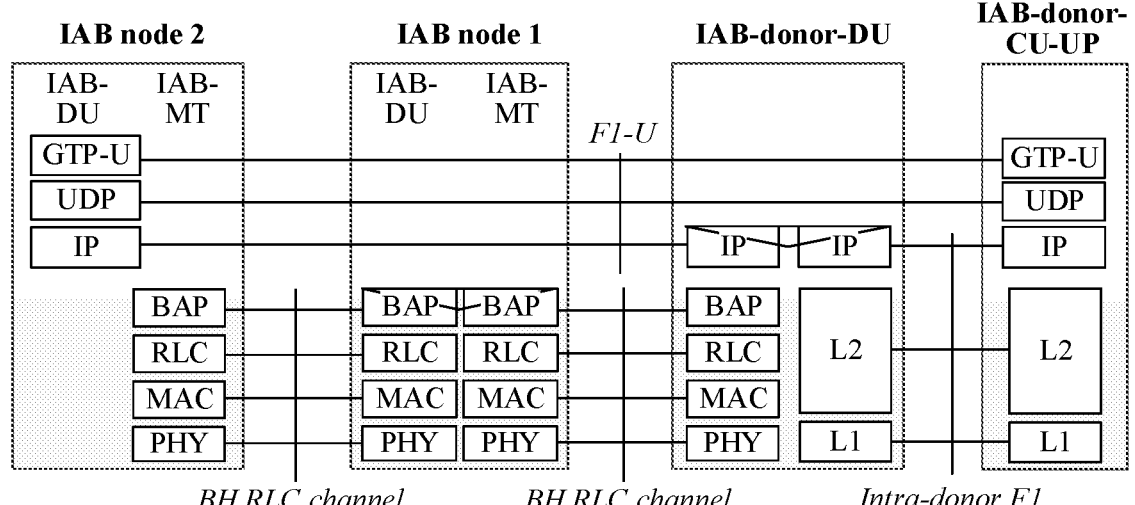
FIG. 1D is a schematic diagram of a user plane protocol stack in an IAB network according to an embodiment of this application.
Figure 1E:
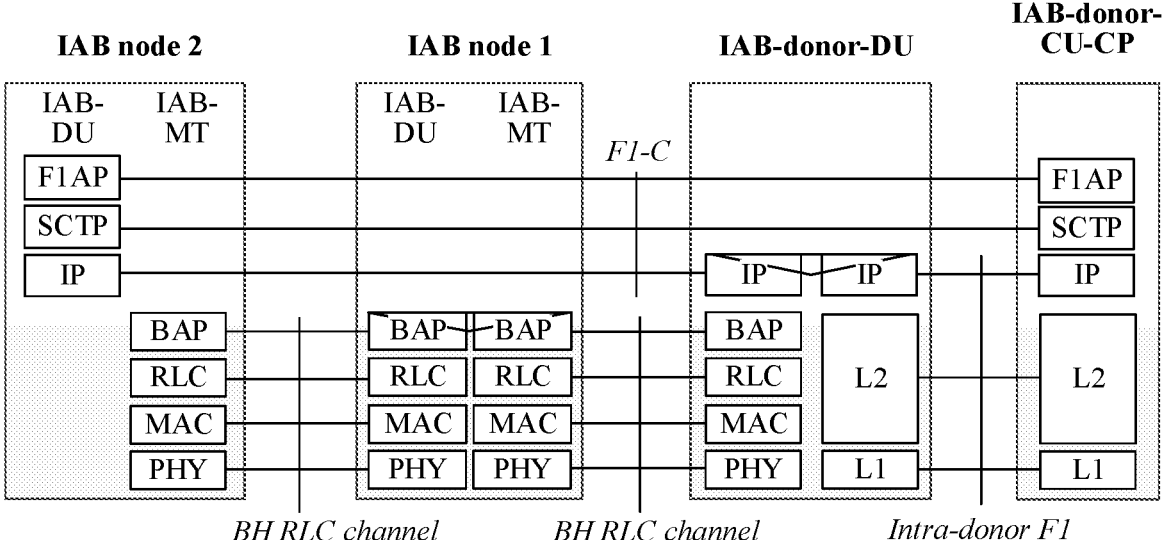
FIG. 1E is a schematic diagram of a control plane protocol stack in an IAB network according to an embodiment of this application.

FIG. 1D is a schematic diagram of a user plane protocol stack in an IAB network according to an embodiment of this application, and FIG. 1E is a schematic diagram of a control plane protocol stack in an IAB network according to an embodiment of this application. The following provides descriptions with reference to FIG. 1D and FIG. 1E.

In current discussion about an IAB network, it is determined that a new protocol layer, namely, a backhaul adaptation protocol (backhaul adaptation protocol, BAP) layer, is introduced to a wireless backhaul link. The protocol layer is located above a radio link control (radio link control, RLC) layer, to implement functions such as routing and bearer mapping of a data packet on the wireless backhaul link.

An F1 interface (or referred to as an F1* interface, which may be collectively referred to as an F1 interface in embodiments of this application, but a name is not limited) needs to be established between an IAB node (a DU part of the IAB) and a donor node (or an IAB-donor-CU). The interface supports a user plane protocol (F1-U/F1*-U) and a control plane protocol (F1-C/F1*-C). The user plane protocol includes one or more of the following protocol layers: a general packet radio service (general packet radio service, GPRS) tunneling protocol user plane (GPRS tunneling protocol user plane, GTP-U) protocol layer, a user datagram protocol (user datagram protocol, UDP) layer, an internet protocol (internet protocol, IP) layer, and the like. The control plane protocol of the interface includes one or more of the following protocol layers: an F1 application protocol (F1AP) layer, a stream control transport protocol (stream control transport protocol, SCTP) layer, an IP layer, and the like.

For a user plane, as shown in FIG. 1D, functions such as user plane data transmission and downlink transmission status feedback may be performed between the IAB node and an IAB donor through a user plane of the F1/F1* interface.

For a control plane, as shown in FIG. 1D, interface management, management on an IAB-DU, UE context—related configuration, and the like may be performed between the IAB node and the IAB donor through a control plane of the F1/F1* interface.

FIG. 1D and FIG. 1E are described by using the protocol stack in the IAB scenario shown in FIG. 1A as an example. Notably, one IAB node may play one or more roles. The IAB node may have one or more protocol stacks of the one or more roles. Alternatively, the IAB node may have a protocol stack, and for different roles of the IAB node, protocol layers corresponding to the different roles in the protocol stack may be used for processing. The following provides descriptions by using an example in which the IAB node has the one or more protocol stacks of the one or more roles.

(1) Protocol Stack of a Common Terminal

When accessing the IAB network, the IAB node can function as a common terminal. In this case, an MT of the IAB node has a protocol stack of the common terminal. After the IAB node accesses the IAB network, the IAB node may still play a role of the common terminal. For example, the IAB node transmits an uplink and/or downlink data packet (for example, an OAM data packet) of the IAB node with an IAB donor, and performs measurement using an RRC layer.

(2) Protocol Stack of an Access IAB Node

After the IAB node accesses the IAB network, the IAB node may provide an access service for a terminal, to play a role of an access IAB node. In this case, the IAB node has a protocol stack of the access IAB node, for example, a protocol stack of an IAB node 2 in FIG. 1D and FIG. 1E.

In this case, there may be two protocol stacks on an interface that is of the IAB node and that faces a parent node of the IAB node. One is the protocol stack of the common terminal, and the other is a protocol stack (namely, the protocol stack of the access IAB node) that provides a backhaul service for the terminal.

(3) Protocol Stack of an Intermediate IAB Node

After the IAB node accesses the IAB network, the IAB node may play a role of an intermediate IAB node. In this case, the IAB node has a protocol stack of the intermediate IAB node, for example, a protocol stack of an IAB node 1 in FIG. 1D and FIG. 1E.

In this case, there may be two protocol stacks on an interface that is of the IAB node and that faces a parent node of the IAB node: the protocol stack of the common terminal, and a protocol stack (namely, the protocol stack of the intermediate IAB node) that provides a backhaul service for an IAB child node.

In addition, the IAB node may play roles of both an access IAB node and an intermediate IAB node. For example, the IAB node may be an access IAB node for some terminals and an intermediate IAB node for other terminals. In this case, the IAB node may have three protocol stacks: the protocol stack of the common terminal, the protocol stack of the access IAB node, and the protocol stack of the intermediate IAB node.

Notably, FIG. 1D and FIG. 1E are described by using the IAB network as an example. Content in FIG. 1D and FIG. 1E is also applicable to a relay network of another type different from the IAB network. For a control plane protocol stack architecture of the relay network, refer to FIG. 1D. For a user plane protocol stack architecture of the relay network, refer to FIG. 1E. The IAB node in FIG. 1D and FIG. 1E may be replaced with a relay (relay). For example, the IAB node 1 may be replaced with a relay node 1, the IAB node 2 may be replaced with a relay node 2, the IAB donor may be replaced with a donor node, and the donor node has a CU protocol stack and a DU protocol stack. Other content is the same as the content described in FIG. 1D and FIG. 1E. For details, refer to the descriptions in FIG. 1D and FIG. 1E, and details are not described herein again.

The IAB node in the IAB network may perform a topology update, for example, a topology update that occurs in a handover process or a radio link failure recovery process. In embodiments of this application, the handover process is used as an example for description, but the topology update is not limited to a topology update generated only due to handover.

Based on different types of the topology update, the following describes several possible scenarios in which the IAB node performs the topology update by using the accompanying drawings.

Figure 1F:
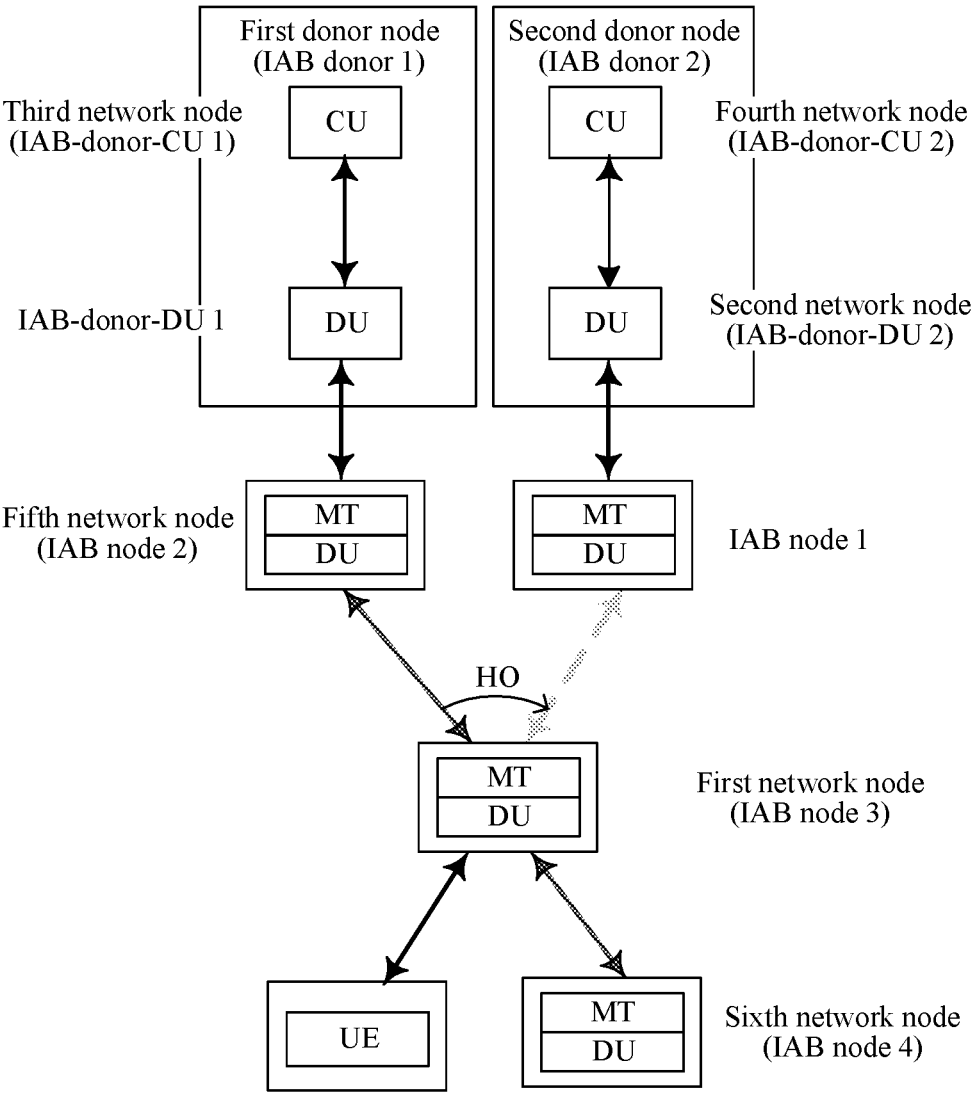
FIG. 1F is a schematic diagram of an inter-IAB donor topology update according to an embodiment of this application.

Scenario 1: Inter-IAB Donor Topology Update as Shown in FIG. 1F, for Example, an Inter-IAB Donor Topology Update Generated Due to IAB Node Handover An IAB node 3 (denoted as a first network node) hands over from a source parent node (for example, an IAB node 1 in FIG. 1F) to a target parent node (for example, an IAB node 2 in FIG. 1F, and denoted as a fifth network node), and changes a connected IAB donor, to be specific, hands over from a source IAB donor (for example, an IAB donor 1 in FIG. 1F, and denoted as a first donor node) to a target IAB donor (for example, an IAB donor 2 in FIG. 1F, and denoted as a second donor node). The first network node also hands over from a source IAB donor DU (for example, an IAB donor DU 1 in FIG. 1F) to a target IAB donor DU (for example, an IAB donor DU 2 in FIG. 1F, and denoted as a second network node). For brevity, a source IAB donor CU may be denoted as a third network node, and a target IAB donor CU may be denoted as a fourth network node. This type of handover may be referred to as inter-IAB donor handover, an inter-IAB donor topology update, an inter-IAB donor CU topology update, or inter-donor CU handover (inter-donor CU migrating).

It is easy to understand that, in the scenario 1, the target IAB donor DU and the target IAB donor CU are alternatively not separated. Similarly, the source donor DU and the source donor CU are alternatively not separated.

Figure 1G:
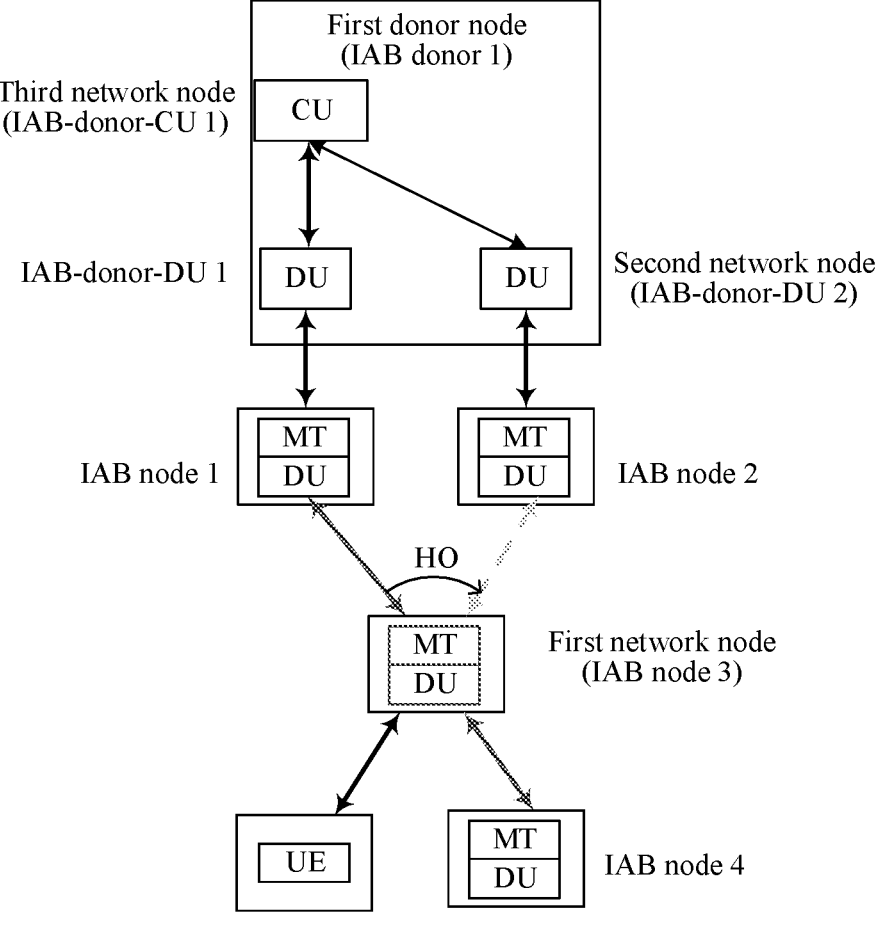
FIG. 1G is a schematic diagram of an intra-IAB donor topology update according to an embodiment of this application.

Scenario 2: Intra-IAB Donor Topology Update as Shown in FIG. 1G, for Example, an Intra-IAB Donor Topology Update Generated Due to IAB Node Handover An IAB node 3 (denoted as a first network node) hands over from a source parent node (for example, an IAB node 1 in FIG. 1G) to a target parent node (for example, an IAB node 2 in FIG. 1G), but does not change an IAB donor, in other words, hands over from a source donor DU (for example, an IAB donor DU 1 in FIG. 1G, and may also be referred to as an original donor DU) under an IAB donor CU (denoted as the third network node) to a target donor DU (for example, an IAB donor DU 2 in FIG. 1G, and denoted as the second network node, which may also be referred to as a new donor DU). This type of handover may be referred to as intra-IAB donor handover, inter-IAB donor DU handover, inter-DU handover, or intra-donor CU handover (intra-donor CU migrating). It is easy to understand that the foregoing scenarios 1 and 2 describe IAB node handover scenarios. Similarly, a parent node (for example, the IAB node 1 in FIG. 1F) of an IAB node may also perform handover, for example, may hand over from a source IAB donor to a target IAB donor. Similarly, a child node (for example, an IAB node 4 in FIG. 1F) of the IAB node may perform handover along with the IAB node, that is, may also hand over from the source IAB donor to the target IAB donor. The method provided in embodiments of this application is applicable to IAB node handover, is also applicable to a scenario in which a child node of the IAB node performs handover along with the IAB node, and is also applicable to another scenario in which an IAB parent node or a donor node connected to the IAB node changes, for example, a scenario in which the IAB node changes a new parent node and even changes a connected IAB donor node after performing link recovery after a radio link failure occurs. In other words, in this application, the topology update in the IAB network may be understood as a topology update generated because the IAB node performs handover. For example, the IAB node performs handover according to a handover command. It may alternatively be understood as a topology update caused by performing an RLF recovery process after a radio link failure (radio link failure, RLF) occurs on the IAB node or after the IAB node receives a BH RLF notification notified by a parent node.

In this application, an MT of the IAB node may be referred to as an IAB-MT for short, a DU of the IAB node may be referred to as an IAB-DU for short, a CU of the IAB donor may be referred to as a donor-CU for short, and a DU of the IAB donor may be referred to as a donor-DU for short.

In this application, an IAB donor connected to the IAB node may be referred to as the IAB donor of the IAB node or a donor node of the IAB node, or is referred to as an IAB donor for short. The IAB node may directly access a cell served by the IAB donor (for example, directly access a cell served by a DU of the IAB donor, or directly access a cell served by an IAB donor whose CU and DU are not separated), or the IAB node may be connected to the IAB donor (for example, a parent node of the IAB node, which is an IAB node that accesses a cell served by the IAB donor) by using another IAB node.

After the IAB node performs the topology update, some data packets (for example, a service data unit (service data unit, SDU) at a BAP layer or a PDU at the BAP layer) on the IAB node have not been successfully sent to a source parent node. If the IAB node changes a connected donor DU after the topology update (for example, the IAB node is separately connected to different donor DUs of a same IAB donor before and after the topology update, or is separately connected to different donor DUs of different IAB donors), how to reduce a data packet loss is a problem that urgently needs to be resolved.

To avoid a loss of these data packets, the IAB node may first buffer these data packets (for example, buffer them at the BAP layer), and send these buffered data packets to a new parent node after the topology update is completed. However, to avoid the loss of these buffered data packets, at least the following two problems still existing in the foregoing data packet sending process need to be resolved:

Problem 1: For a case in which a connected IAB donor DU is changed after the topology update, for example, in the foregoing scenarios 1 and 2, after the topology update, the IAB node sends buffered uplink data packets to a new parent node, and the new parent node is not connected to an original IAB donor DU (or referred to as a source IAB donor DU), and can only be connected to a new IAB donor DU (or referred to as a target IAB donor DU). However, in a conventional technology, rerouting and forwarding of an uplink data packet between different IAB donor DUs (for example, different IAB donor DUs of a same IAB donor, or different IAB donor DUs of different IAB donors) are not supported.

Problem 2: Even if problem 1 is resolved, and these buffered data packets are forwarded to the target IAB donor DU, a problem of how the target IAB donor DU correctly forwards the data packets needs to be further resolved.

After the IAB node performs an inter-IAB donor topology update, even if some uplink data packets originally to be sent to the source IAB donor node can be sent to the target IAB donor DU on the wireless backhaul link, source IP addresses of these uplink data packets may be original IP addresses obtained by the IAB node when the IAB node is connected to the source IAB donor node. If the target IAB donor DU configures a source IP address filtering mechanism, the target IAB donor DU may not forward these data packets or even discards these data packets because an original IP address of the IAB node does not belong to a range of source IP addresses allowed to be forwarded. If these uplink data packets cannot be transmitted to the source IAB donor CU at the IAB node or at the target IAB donor DU, for a conventional terminal, the terminal also cannot send corresponding packet data convergence protocol (packet data convergence protocol, PDCP) SDUs in these data packets to the target IAB donor CU. Therefore, some data packets may be lost in a topology update process.

In addition, even after the data packets are forwarded by the target IAB donor DU to the target IAB donor CU, if security protection (for example, integrity protection or encryption of UE at a PDCP layer, or encryption of the IAB node at an IPsec layer) is performed on the data packets based on a security mechanism negotiated with the source IAB donor CU, the data packets may also fail to be correctly parsed by the target IAB donor CU or an integrity protection check fails. Therefore, these data packets still need to be transmitted to the source IAB donor CU for processing.

Figure 2A:
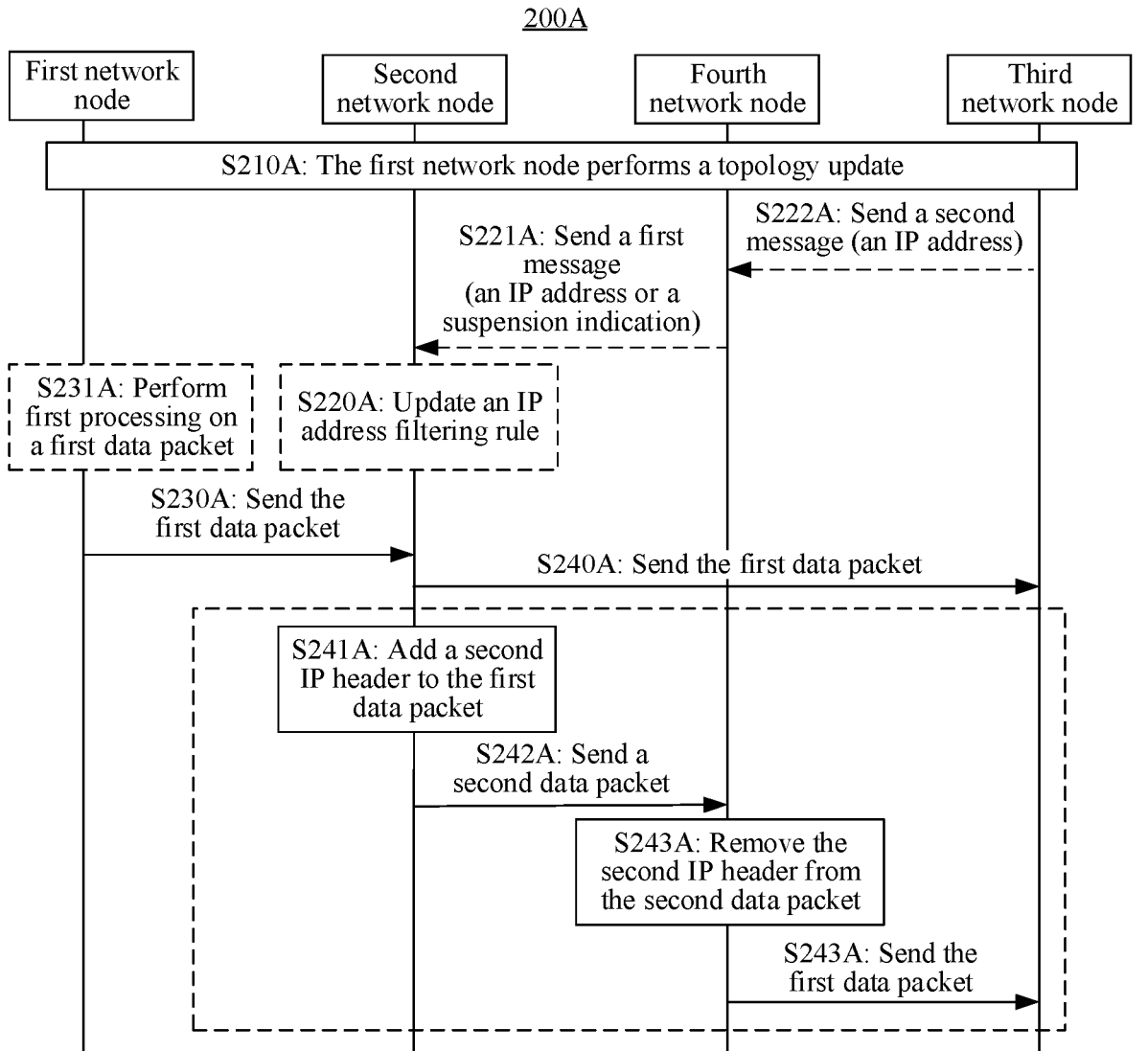
FIG. 2A is a schematic diagram of a lossless data transmission communication method according to an embodiment of this application.

As shown in FIG. 2A, to resolve the foregoing problem that occurs when the target donor node DU and the target donor node CU are separated in the foregoing scenario 1, an embodiment of this application provides a lossless data transmission communication method 200A, including the following steps.

S210A: A first network node performs a topology update. The topology update includes that the first network node changes a connected IAB donor DU. For example, the IAB donor DU connected to the first network node is changed to a second network node. The second network node is a target IAB donor DU of the topology update performed by the first network node.

S230A: The first network node sends a first data packet to the second network node. A destination node of an IP layer of the first data packet is a third network node. It is easy to understand that when a CU and a DU of a source IAB donor of the first network node are separated, the third network node is a source IAB donor CU of the first network node; or when the CU and the DU of the source IAB donor of the first network node are not separated, the third network node is the source IAB donor of the first network node, in other words, the first data packet is a data packet to be sent to the third network node. For example, the first data packet may be a data packet that is buffered by the first network node at a BAP layer before the first network node performs the topology update and that is to be sent to the third network node. It may be understood that the destination node of the first data packet may alternatively be a security gateway (security gateway, SeGW) device on the third network node side.

Optionally, before that the first network node sends a first data packet to the second network node, the S230A further includes S231A: The first network node performs a first processing operation on the first data packet. For example, the first processing operation is updating header information of a BAP layer of the first data packet. For example, the first network node receives BAP layer configuration information from a target IAB donor CU, and the first network node updates the header information of the BAP layer of the first data packet based on the BAP layer configuration information. Specifically, the first network node replaces, based on the BAP layer configuration information, a BAP routing identifier in the header information of the BAP layer of the first data packet with a configured new routing identifier. The new routing identifier points to a transmission path to the second network node. In this manner, the first network node can successfully send the first data packet to the second network node. In a possible implementation, before S230A, the method further includes S220A: The second network node updates an IP address filtering rule to forward the first data packet to the third network node.

The second network node updates the IP address filtering rule to send the first data packet to the third network node. For example, updating the IP address filtering rule may be adding a source IP address of the first data packet to a whitelist of a source IP address filtering rule, or that the second network node temporarily disables the source IP address filtering rule. This can avoid a case in which the second network node does not forward the first data packet or even discards the first data packet because an IP address of the first data packet does not belong to a range of source IP addresses allowed to be forwarded.

S240A: The second network node sends the first data packet to the third network node.

Considering that in some possible scenarios, the second network node can see only an outer IP header of the first data packet, and the destination node of the IP layer of the first data packet may be the third network node, or may be the security gateway device deployed on the third network node side, if corresponding IP routing is configured for the second network node and it can be found that the destination node for forwarding the IP layer is the third network node (which may be specifically a third network node CU-CP or a third network node CU-UP) or an appropriate next-hop node of a security gateway (referred to as a source SeGW for short) deployed on the third network node side, the first data packet may be sent to the source IAB donor CU or the source SeGW by using the next-hop node. However, if an IP layer of the target second network node is not configured with IP routing whose destination node is the third network node, the second network node cannot directly send the first data packet to the third network node through routing and forwarding at the IP layer.

For a problem of how to ensure that the second network node can send the first data packet to the third network node, optionally, the method 240A further includes:

S241A: The second network node obtains a second data packet. The first data packet is encapsulated into the second data packet, the second data packet includes a first IP header and a second IP header, a target IP address of the first IP header is an IP address of the third network node or an IP address of a first security gateway device connected to the third network node, and a target IP address of the second IP header is an IP address of a fourth network node. Optionally, the first security gateway device may be a security gateway device deployed on the third network node side.

Optionally, the second IP header may be added by the second network node to the first data packet, or may be added by the first network node to the first data packet. In other words, in a manner in which the second network node obtains the second data packet, after the second network node receives the first data packet sent by the first network node, the second network node adds the second IP header to the first data packet to obtain the second data packet. In another manner in which the second network node obtains the second data packet, in S220A, when sending the first data packet to the second network node, the first network node adds the second IP header to the first data packet, in other words, the second network node receives, from the first network node, the second data packet encapsulated with the first data packet.

S242A: The second network node sends the second data packet to the fourth network node. It may be understood as that the second network node sends the second data packet to the fourth network node based on the second IP header.

Optionally, the second data packet further includes first removal indication information indicating the fourth network node to remove the second IP header. Optionally, the first removal indication information may be indicated by using a bit or a special field. Another implementation in which the fourth network node can be indicated to remove the second IP header is not limited in this application.

S243A: The fourth network node sends the first data packet to the third network node.

Optionally, after removing the second IP header of the second data packet based on the first removal indication information, the fourth network node determines, based on the first IP header of the second data packet, to send the first data packet to the third network node. It may be understood that the first IP header is included in the first data packet, and the first data packet may be obtained after the second IP header is removed from the second data packet.

In other words, the second network node or the first network node encapsulates a new outer IP header (the second IP header) outside the first data packet whose target IP address is the IP address of the third network node (or the source SeGW) to obtain the second data packet. A target address of the new IP header is an IP address of the fourth network node. After the second network node forwards, based on an IP address of a destination node in the new outer IP header, the second data packet to the fourth network node through IP routing, the fourth network node removes the new outer IP header, and then forwards the first data packet to the destination node (that is, the third network node or the source SeGW) at the IP layer of the data packet through IP routing. To enable the fourth network node to identify specific received IP data packets on which such special receiving processing (to be specific, the processing is that the packets are forwarded based on an inner IP header after the outer IP header is removed) needs to be performed, a node that adds the outer IP header may include the first removal indication information in the outer IP header.

According to the method 200A, forwarding or rerouting of an uplink data packet between the second network node and the third network node (for example, inter-IAB donor or inter-IAB donor DU) may be allowed. This avoids that the uplink data packet is discarded by the second network node in a rerouting process, completes rerouting and forwarding of the data packet between different donor nodes, and reduces a data packet loss.

In the foregoing S210A, the topology update may include a topology update generated due to handover or in a radio link recovery process.

In S231A, this embodiment of this application lists two cases as examples in which the first network node performs first processing on the first data packet.

Case 1: The first data packets are SDUs at a BAP layer that are received from an upper-layer protocol layer, and the first processing is: The first network node adds header information of the BAP layer to the SDUs of the first data packets based on received new BAP layer configurations. Optionally, the new BAP layer configurations are sent by the fourth network node to the first network node.

Specifically, if the first data packets buffered by the first network node (for example, an IAB node 3 shown in FIG. 1F) are SDUs at a BAP layer that are received from an upper-layer protocol layer, after the topology update, for example, after S210A is performed, the first network node adds, based on the received new BAP layer configurations, header information of the BAP layer to these buffered SDUs (where the header information of the BAP layer includes a routing identifier (BAP routing ID) corresponding to a target path, the target path includes a target parent node (for example, an IAB node 1 shown in FIG. 1F), the BAP routing ID includes a BAP address (BAP address) and a BAP path identifier (BAP path ID), the BAP address in the BAP routing ID corresponding to the target path indicates a destination node of the BAP layer, that is, a target IAB donor (for example, a second donor node shown in FIG. 1F) or a target IAB donor DU (for example, an IAB donor DU 2 shown in FIG. 1F), and the BAP path ID indicates a transmission path between the first network node and the target IAB donor or the target IAB donor DU). The first network node transmits the first data packets to the target IAB donor DU based on a new routing identifier and a new routing configuration that are provided by the target IAB donor CU. If the first data packet is a PDU at an F1 interface protocol layer of the first network node, for example, the first data packet is an IP packet at an IP layer included in an F1 interface user plane or control plane protocol stack, and the F1 interface protocol layer may be considered as an upper layer of the BAP layer, in an IP layer header added to the upper-layer protocol layer (for example, an IP layer on a DU side of the first network node) of the BAP layer, an IP address filled in a source IP address field is still an IP address (denoted as a first IP address for brevity) obtained by the first network node when the first network node is connected to a source IAB donor (for example, a first donor node shown in FIG. 1F), and an IP address filled in a target IP address field is an IP address of a source IAB donor (which may be specifically a source IAB donor CU, a source IAB donor CU CP, or a source IAB donor CU UP).

It may be understood that the upper-layer protocol layer of the BAP layer in this embodiment of this application may be the IP layer on the DU side of the first network node.

Case 2: The first data packets are PDUs at a BAP layer, in other words, the first data packet already carries header information of the BAP layer. In this case, the first processing is: The first network node updates the header information of the BAP layer for the PDUs of the first data packets based on received new BAP layer configurations. Optionally, the new BAP layer configurations are sent by the fourth network node to the first network node.

Specifically, if an uplink data packet buffered by the first network node is the PDU at the BAP layer, that is, already carries header information of the BAP layer, where a destination node of the BAP layer that is indicated by a routing identifier BAP routing ID is a source IAB donor DU (for example, an IAB donor DU 1 shown in FIG. 1F) and a path indicated by a BAP path ID carried in the BAP routing ID is still a transmission path to the source IAB donor DU, and routing selection in an IAB network is performed based on a routing identifier in an adaptation layer header, in other words, for a node that performs the routing selection, if an entry corresponding to the BAP routing ID exists in a configured routing table when routing is selected for a data packet carrying the BAP routing ID, and a next-hop node specified in the entry is an available next-hop node, the data packet is sent to the next-hop node specified in the entry. If the entry corresponding to the BAP routing ID cannot be found in the routing table or the next-hop node specified in the entry corresponding to the BAP rouging ID is unavailable, an available next-hop node specified in any entry that is the same as the BAP address part carried in the data packet may be selected, from one or more entries in the routing table, as a next-hop node for sending the data packet. It may be understood that when the first network node performs the topology update in S210A, if a target IAB donor DU connected through the target parent node is different from a source IAB donor DU connected through a source parent node, an uplink destination node (uplink) of the BAP layer changes in addition to a transmission path. Therefore, before the first network node forwards the first data packets, the header information of the BAP layer of the data packets needs to be modified. For example, the first network node receives configuration information provided by the target IAB donor CU (for example, a fourth network node shown in FIG. 1F), and the configuration information may be sent to the first network node by using an RRC message or an F1AP message. Specific content includes one or more new routing identifiers (for example, a default/default BAP routing ID, which may be used to forward all buffered data packets) to the target IAB donor DU, and optionally, further includes a next-hop node corresponding to each routing identifier, and an original routing identifier (pointing to an original transmission path to the source IAB donor DU) mapping to each new routing identifier. The first network node replaces, based on the configuration information provided by the target IAB donor CU, the BAP routing IDs in the header information of the BAP layer carried in BAP PDUs being buffered by the first network node with the configured new routing identifiers, performs routing selection based on the new routing identifiers, and sends the data packets to the next-hop node (that is, the target parent node), to ensure that the data packets buffered before handover are forwarded to the target IAB donor DU after the handover is completed. Optionally, if the PDU at the BAP layer buffered by the first network node does not include a routing identifier (for example, the PDU is a BAP control PDU), the first network node may directly send the BAP control PDU (for example, a flow control feedback control PDU including a backhaul RLC channel (BH RLC channel) granularity) to the target parent node, or delete the BAP control PDU (for example, a flow control feedback control PDU including a BAP routing ID granularity).

In S220A, if the first network node does not add the second IP header to the first data packet, this embodiment of this application provides several possible manners in which the second network node updates the IP address filtering rule.

Manner 1: Adding the Source IP Address of the First Data Packet to the Whitelist of the Source IP Address Filtering Rule Optionally, the S220A further includes:

S221A: The fourth network node sends a first message to the second network node. The first message carries the first IP address. The first IP address is one or more IP addresses obtained by the first network node when the first network node is connected to the third network node.

After receiving the first message, the second network node updates the IP address filtering rule based on the first message. For example, the second network node adds the first IP address to the whitelist of the source IP address filtering rule.

It can be understood that, in this embodiment of this application, the fourth network node obtains the first IP address in a plurality of possible manners.

Optionally, S222A: The fourth network node receives a second message sent by the third network node. The second message includes the first IP address.

Optionally, the fourth network node receives a third message (not shown in FIG. 2A) sent by the first network node. The third message includes the first IP address, and the third message may be an RRC message.

Specifically, the fourth network node may send, to the second network node, the one or more IP addresses (for ease of description, referred to as the first IP address for short) obtained by the first network node when the first network node is connected to the third network node. After receiving the first IP address, the second network node may add the first IP address to the whitelist (that is, a list of source IP addresses of data packets that are allowed to be forwarded) of the source IP address filtering rule of the second network node. The first IP address may be sent by the third network node to the fourth network node. For example, the first network node performs Xn interface-based handover, and the third network node includes the first IP addresses of the first network nodes in an Xn interface message (for example, an Xn interface handover request (Handover Request) message) and sends the Xn interface message to the fourth network node. Alternatively, an AMF sends the first IP address to the fourth network node. For example, the first network node performs NG interface-based handover, the third network node includes the first IP addresses of the first network nodes in an NG interface message (for example, an NG interface handover required (Handover required) message) and sends the NG interface message to a target AMF, and the AMF sends the first IP addresses of the first network nodes to the fourth network node in the NG interface message (for example, the NG interface handover request message). Alternatively, the first network node may send the first IP address to the fourth network node. For example, the first network node sends the first IP address to the fourth network node by using an RRC message (which may be specifically an RRC reconfiguration complete message) after the topology update is completed.

Manner 2: Disabling the Source IP Address Filtering Rule Temporarily

Optionally, the S220A further includes:

S221A: The fourth network node sends a first message to the second network node. The first message carries first suspension indication information, and the first suspension indication information indicates the second network node to temporarily disable the source IP address filtering rule.

The second network node temporarily disables the source IP address filtering rule based on the first suspension indication information.

It may be understood that the first suspension indication information may be a bit indication or timer configuration information. This is not limited in this embodiment of this application, provided that the second network node can be indicated to temporarily disable the source IP address filtering rule.

In this embodiment of this application, the second network node may temporarily disable the source IP address filtering rule in a plurality of manners. For example, the implementation is performed by using a timer or by waiting for information indicating to enable (or resume) the filtering rule again. Specifically, for example, after the first suspension indication information is received, the source IP address filtering rule may be disabled, the timer is started, and the source IP address filtering rule is resumed after a preset condition is met. The preset condition may be that the timer expires, or an indication of another network node is received. This is not limited in this embodiment of this application.

In S240A, the third network node obtains the first data packet in two manners: receiving the first data packet directly sent by the second network node; or receiving the first data packet forwarded by the fourth network node, where the fourth network node receives, from the network second node, the second data packet into which the first data packet is encapsulated, and the second data packet is obtained by encapsulating the first data packet by the second network node and includes the second IP header. After removing the second IP header of the second data packet, the fourth network node sends the first data packet to the third network node.

In this embodiment of this application, after the third network node obtains the first data packet, there may be several data packet processing manners.

Data packet processing manner 1: The third network node determines, based on the first data packet, data related to a terminal device served by the first network node. The data may be data related to service continuity of the terminal, for example, a PDCP SDU.

The third network node sends the data related to the terminal device to the fourth network node.

Specifically, after receiving processing is performed on the first data packet by the third network node (for example, a PDCP SDU is obtained after the receiving processing is performed on a user plane data packet by the third network node), if needed (for example, if an uplink data packet is still not completely transmitted after a user plane transmission channel to a core network switches to the fourth network node), the first data packet may be further forwarded by the third network node to the fourth network node through an Xn user plane (Xn-U) interface, to ensure the service continuity of the terminal device served by the first network node after the first network node performs handover.

Data packet processing manner 2: The third network node determines, based on the first data packet, data, for example, PDCP SDUs, related to a terminal device served by the first network node.

The third network node sends the data related to the terminal device to a UPF.

Specifically, if the third network node wants to send the PDCP SDUs to the UPF through an NG interface, the UPF may separately maintain two general packet radio service tunneling protocol tunnels (general packet radio service tunneling protocol tunnels, GPRS tunneling protocol tunnels, GTP tunnels) of an N3 interface for PDU sessions of UE (including UE accessing a serving cell of the first network node or UE accessing a serving cell of a descendent IAB node of the first network node) served by the first network node that are between the UPF and the third network node and between the UPF and the fourth network node during the topology update performed by the first network node. The UPF may receive data packets of the UE from the two GTP tunnels in a period of time. After the third network node determines that transmission of all uplink PDCP SDUs is completed, the UPF may release a GTP user plane tunnel (GTP-User tunnel, GTP-U tunnel) of the N3 interface that is between the UPF and the third network node based on an uplink end marker (UL end-marker) of the third network node.

Figure 2B:
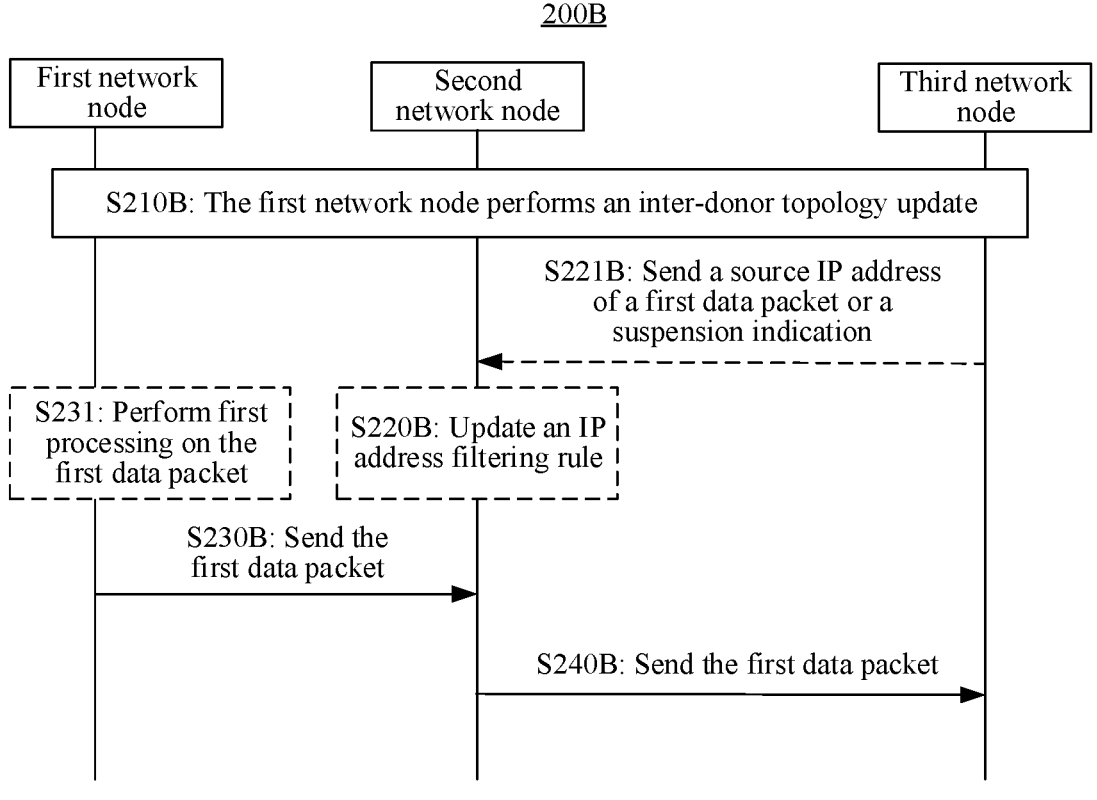
FIG. 2B is a schematic diagram of another lossless data transmission communication method according to an embodiment of this application.

As shown in FIG. 2B, to resolve the foregoing problem that occurs when the target donor node DU and the target donor node CU are separated in the foregoing scenario 1, an embodiment of this application provides a lossless data transmission communication method 200B, including the following steps.

S210B: A first network node performs a topology update. The topology update includes that the first network node changes a connected IAB donor. For example, the IAB donor connected to the first network node is changed to a second network node. The second network node may be referred to as a target IAB donor node of the topology update performed by the first network node, and a DU and a CU of the second network node are not separated.

S230B: The first network node sends a first data packet to the second network node.

A destination node of an IP layer of the first data packet is a third network node. It is easy to understand that when a CU and a DU of a source IAB donor of the first network node are separated, the third network node is a source IAB donor CU of the first network node; or when the CU and the DU of the source IAB donor of the first network node are not separated, the third network node is the source IAB donor of the first network node, in other words, the first data packet is a data packet to be sent to the third network node. For example, the first data packet may be a data packet that is buffered by the first network node at a BAP layer before the first network node performs the topology update and that is to be sent to the third network node. It may be understood that the destination node of the first data packet may alternatively be a SeGW device on the third network node side. Optionally, before that the first network node sends a first data packet to the second network node, the S230B further includes S231B: The first network node performs a first processing operation on the first data packet. For example, the first processing operation is updating header information of a BAP layer of the first data packet. For example, the first network node receives BAP layer configuration information from a target IAB donor, and the first network node updates the header information of the BAP layer of the first data packet based on the BAP layer configuration information. Specifically, the first network node replaces, based on the BAP layer configuration information, a BAP routing identifier in the header information of the BAP layer of the first data packet with a configured new routing identifier. The new routing identifier points to a transmission path to the second network node. In this manner, the first network node can successfully send the first data packet to the second network node.

In a possible implementation, before S230B, the method further includes S220B: The second network node updates an IP address filtering rule to forward the first data packet to the third network node.

The second network node updates the IP address filtering rule to send the first data packet to the third network node. For example, updating the IP address filtering rule may be adding a source IP address of the first data packet to a whitelist of a source IP address filtering rule, or that the second network node temporarily disables the source IP address filtering rule. This can avoid a case in which the second network node does not forward the first data packet or even discards the first data packet because an IP address of the first data packet does not belong to a range of source IP addresses allowed to be forwarded.

In the method 200B, the second network node obtains the source IP address of the first data packet in a plurality of possible manners. The source IP address of the first data packet is one or more IP addresses when the first network node is connected to the third network node. Specifically, when the third network node is an IAB donor node whose CU and DU are separated, the source IP address of the first data packet is the one or more IP addresses when the first network node is connected to the DU of the third network node.

In a possible manner, the second network node receives the source IP address sent by the first network node.

In another possible manner, the second network node receives the source IP address sent by the third network node. In this case, the method 200B further includes S221B: The second network node receives the source IP address of the first data packet or suspension indication information that is sent by the third network node. The suspension indication information indicates the second network node to suspend the source IP address filtering rule. It is easy to understand that for an implementation in which the second network node temporarily disables the source IP address filtering rule, refer to the descriptions in step S221A in the method 200A.

In still another possible manner, the second network node receives the source IP address sent by an AMF.

S240B: The second network node sends the first data packet to the third network node.

According to the method 200B, forwarding or rerouting of an uplink data packet between the second network node and the third network node (for example, inter-IAB donor or inter-IAB donor DU) may be allowed. This avoids that the uplink data packet is discarded by the second network node in a rerouting process, completes rerouting and forwarding of the data packet between different donor nodes, and reduces a data packet loss.

Figure 2C:
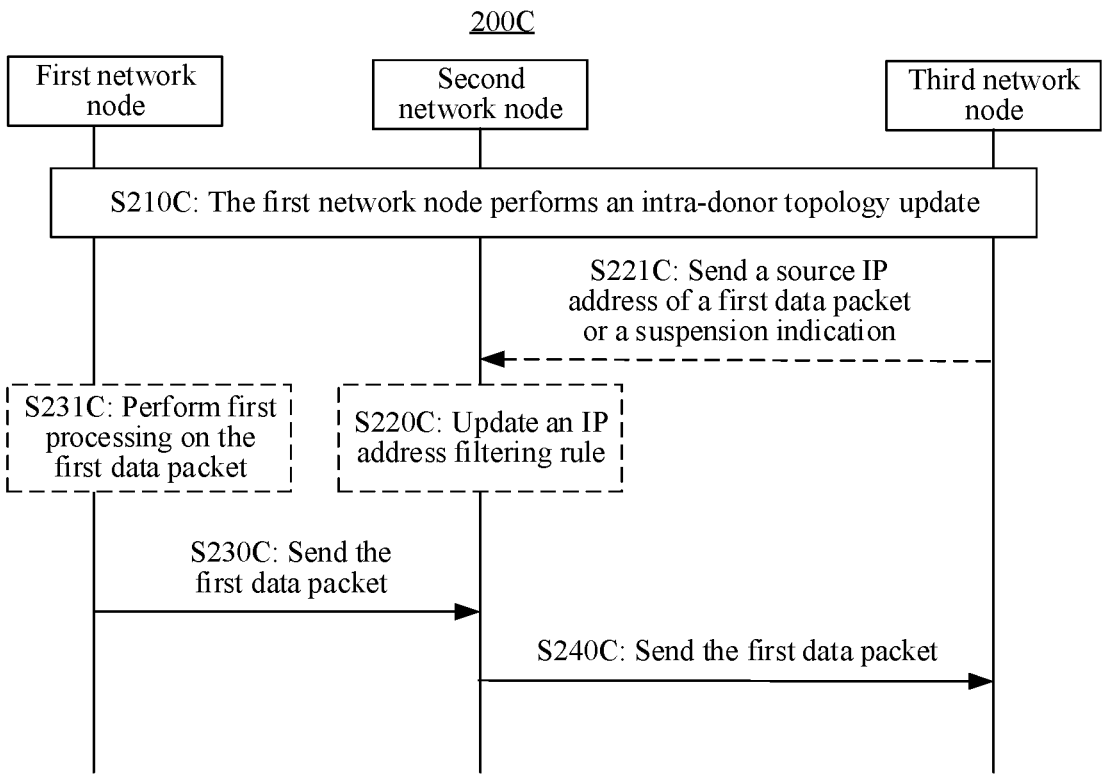
FIG. 2C is a schematic diagram of another lossless data transmission communication method according to an embodiment of this application.

As shown in FIG. 2C, to resolve the foregoing problem that occurs during an intra-donor node topology update in the foregoing scenario 2, an embodiment of this application provides a lossless data transmission communication method 200C, including the following steps.

S210C: A first network node performs a topology update. The topology update includes: The first network node changes a connected IAB donor DU under a same donor node, that is, the IAB donor DU connected to the first network node is changed to a second network node. The second network node may be referred to as a target IAB donor DU of the topology update performed by the first network node, and the second network node is a DU under a source donor node of the first network node.

S230C: The first network node sends a first data packet to the second network node.

A destination node of an IP layer of the first data packet is a third network node. It is easy to understand that the third network node is a source IAB donor CU of the first network node. In other words, the first data packet is a data packet to be sent to the third network node. For example, the first data packet may be a data packet that is buffered by the first network node at a BAP layer before the first network node performs the topology update and that is to be sent to the third network node. It may be understood that the destination node of the first data packet may alternatively be a SeGW device on the third network node side. Optionally, before that the first network node sends a first data packet to the second network node, the S230C further includes S231C: The first network node performs a first processing operation on the first data packet. For example, the first processing operation is updating header information of a BAP layer of the first data packet. For example, the first network node receives BAP layer configuration information from the third network node, and the first network node updates the header information of the BAP layer of the first data packet based on the BAP layer configuration information. Specifically, the first network node replaces, based on the BAP layer configuration information, a BAP routing identifier in the header information of the BAP layer of the first data packet with a configured new routing identifier. The new routing identifier points to a transmission path to the second network node. In this manner, the first network node can successfully send the first data packet to the second network node.

In a possible implementation, before S230C, the method further includes S220C: The second network node updates an IP address filtering rule to forward the first data packet to the third network node.

The second network node updates the IP address filtering rule to send the first data packet to the third network node. For example, updating the IP address filtering rule may be adding a source IP address of the first data packet to a whitelist of a source IP address filtering rule, or that the second network node temporarily disables the source IP address filtering rule. This can avoid a case in which the second network node does not forward the first data packet or even discards the first data packet because an IP address of the first data packet does not belong to a range of source IP addresses allowed to be forwarded.

In the method 200C, the second network node obtains the source IP address of the first data packet in a plurality of possible manners. The source IP address of the first data packet is one or more IP addresses when the first network node is connected to a source donor DU.

In a possible manner, the second network node receives the source IP address sent by the first network node.

In another possible manner, the second network node receives the source IP address sent by the third network node. Optionally, the method 200C further includes S221C: The second network node receives the source IP address of the first data packet or suspension indication information that is sent by the third network node. The suspension indication information indicates the second network node to suspend the source IP address filtering rule. It is easy to understand that for an implementation in which the second network node temporarily disables the source IP address filtering rule, refer to the descriptions in step S221A in the method 200A.

S240C: The second network node sends the first data packet to the third network node.

According to the method 200C, forwarding or rerouting of an uplink data packet between the second network node and the third network node may be allowed. This avoids that the uplink data packet is discarded by the second network node in a rerouting process, completes rerouting and forwarding of the data packet between different donor nodes, and reduces a data packet loss.

Figure 3:
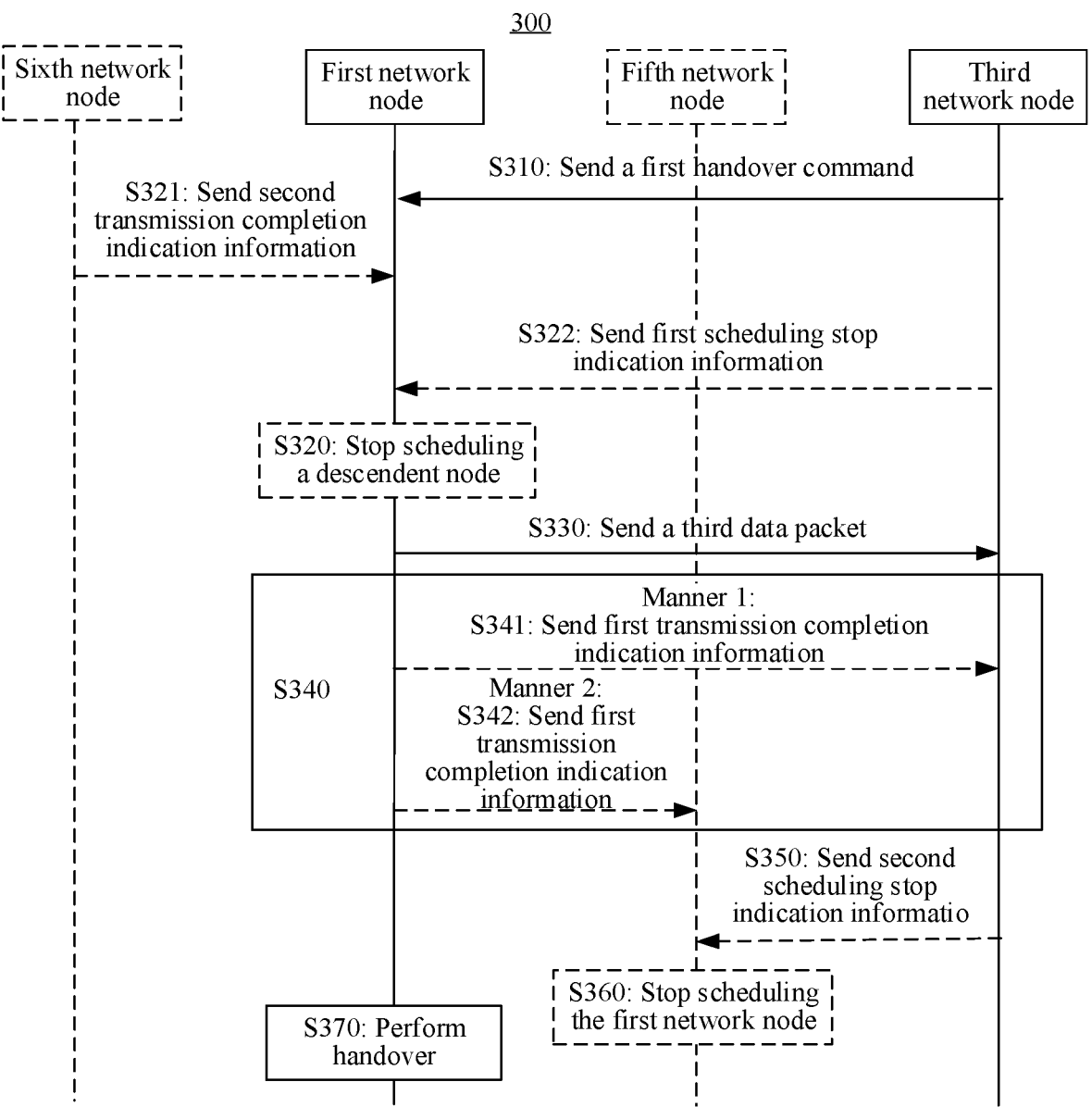
FIG. 3 is a schematic diagram of another lossless data transmission communication method according to an embodiment of this application.

As shown in FIG. 3, still another embodiment of this application provides a lossless data communication method. Similarly, for a problem of how to ensure that no data packet is lost in an inter-IAB donor topology update process, compared with the embodiments shown in FIG. 2A to FIG. 2C, a main idea of a design solution of the method shown in FIG. 3 is to ensure that an IAB node 3 performs an inter-IAB donor topology update only when all in-transit uplink data packets buffered by an IAB node (for example, an IAB node 3 in FIG. 1F) that performs handover and a descendent node (for example, an IAB node 4 in FIG. 1F) of the IAB node 3 are sent to a source parent node of the IAB node 3. This embodiment is described by using a topology update of a type in which the IAB node 3 performs handover as an example. The method 300 in the embodiment shown in FIG. 3 includes the following steps.

S310: A third network node sends a first handover command to a first network node.

Correspondingly, the first network node receives the first handover command from the third network node. The first handover command indicates the first network node to hand over to a second network node, the second network node is a target donor node of the first network node, and the third network node is a source donor node CU of the first network node. For example, the first handover command may be carried in an RRC reconfiguration message.

S320: The first network node stops scheduling a descendent node. The descendent node includes a descendent network node (denoted as a sixth network node) and/or a descendent terminal of the first network node. In this embodiment of this application, after receiving the first handover command, the first network node may immediately stop scheduling a terminal in a cell accessing a service and the sixth network node, or may immediately stop scheduling the terminal in the cell accessing the service but does not immediately stop scheduling the sixth network node.

In this embodiment of this application, two manners in which the first network node stops uplink scheduling for the sixth network node are provided as examples.

Manner 1 of stopping uplink scheduling: S321: The sixth network node sends second transmission completion indication information to the first network node. The second transmission completion indication information indicates that transmission of a fourth data packet is completed, and the fourth data packet includes uplink data from the sixth network node, a descendent node of the sixth network node, and a descendent terminal corresponding to the sixth network node. It may be understood that the second transmission completion indication information indicates that all uplink data being buffered by the sixth network node, the descendent node of the sixth network node, and the descendent terminal has been sent. It is easy to understand that the fourth data packet in this embodiment of this application may include one or more data packets. The fourth data packet may be sent once, or may be sent for a plurality of times.

Optionally, the second transmission completion indication information may be carried in the fourth data packet, for example, carried in a last uplink BAP layer data PDU in the fourth data packet, or carried in a BAP layer control PDU. For example, a special BAP control PDU may be defined to indicate the second transmission completion indication information. It may be understood that the second transmission completion indication information may be sent together with a last data packet in the fourth data packet; or the second transmission completion indication information is independently sent after the last data packet in the fourth data packet is sent. For example, the second transmission completion indication information is carried in a BAP layer control PDU that is separately sent by the sixth network node to the first network node. The second transmission completion indication information may be indicated by using a bit, or may be indicated by using a special field. This is not limited in this application. When the one or more data packets in the fourth data packet are sent for a plurality of times, before the sixth network node sends the second transmission completion indication information, the sixth network node sends the one or more data packets in the fourth data packet to the first network node or to the third network node by using the first network node.

Correspondingly, after receiving the second transmission completion indication information, the first network node stops, based on the second transmission completion indication information, the uplink scheduling for the sixth network node.

Manner 2 of stopping uplink scheduling: S322: The first network node receives first scheduling stop indication information from the third network node. The first scheduling stop indication information indicates the first network node to stop scheduling the sixth network node.

Correspondingly, after receiving the first scheduling stop indication information, the first network node stops the uplink scheduling for the sixth network node based on the first scheduling stop indication information.

S330: The first network node sends a third data packet to the third network node. Optionally, it may be understood that the first network node sends the third data packet to the third network node by using a fifth network node, and the fifth network node is a parent node of the first network node. The third data packet includes uplink data from the first network node and/or a descendent node of the first network node. The third network node is a source IAB donor CU.

S340: The first network node sends first transmission completion indication information. The first transmission completion indication information indicates that transmission of the third data packet is completed. In other words, the first transmission completion indication information indicates that all in-transit uplink data packets buffered by the first network node and the descendent node of the first network node that perform handover are sent to the parent node or a donor node of the first network node.

Optionally, the second transmission completion indication information may be sent together with a last data packet in the third data packet, or may be independently sent after it is determined that all the third data packets are sent. This is similar to a sending occasion and a carrying manner of the second transmission completion indication information. For details, refer to the foregoing related descriptions.

This embodiment of this application provides two manners of sending the first transmission completion indication information by the first network node as examples.

Manner 1:

S341: The first network node sends the first transmission completion indication information to the third network node. Correspondingly, after the third network node receives the first transmission completion indication information, the method 300 may further include: S350: The third network node sends second scheduling stop indication information to the fifth network node. The second scheduling stop indication information indicates the fifth network node to stop scheduling the first network node.

Manner 2:

S342: The first network node sends the first transmission completion indication information to the fifth network node. Correspondingly, the fifth network node receives the first transmission completion indication information.

The method 300 may further include: S360: The fifth network node stops scheduling the first network node. It is easy to understand that a manner in which the fifth network node stops scheduling the first network node may be: After receiving the first transmission completion indication information in S342, the fifth network node stops scheduling the first network node based on the first transmission completion indication information. Alternatively, after receiving the second scheduling stop indication information in S350, the second network node stops scheduling the first network node based on the second scheduling stop indication information.

Optionally, S370: The first network node performs handover. For example, the handover is: The donor node of the first network node is changed from the third network node to the second network node.

According to the foregoing method 300, after receiving the first handover command and transmitting all uplink data packets being buffered to the parent node, the first network node sends information indicating that transmission of uplink data is completed, so that the first network node performs the handover only after determining that the uplink data packets of the first network node and the descendent node of the first network node are successfully sent. This can ensure lossless transmission of the uplink data packets in a handover process.

If the IAB node (for example, the IAB node 3 in FIG. 1F) that performs handover is capable of maintaining communication with both an IAB donor connected before the handover and an IAB donor connected after the handover, for example, the IAB node supports dual connectivity (dual connectivity, DC) or a dual active protocol stack (dual active protocol stack, DAPS), in a handover process, migrating the IAB node may maintain data transmission with both IAB donors. Considering that the IAB node performs routing on a wireless backhaul link based on a routing identifier of a BAP layer, and identifies a target node on the wireless backhaul link based on a BAP address, while a BAP address of an IAB donor DU is allocated by an IAB donor CU and can only be ensured to be unique within a CU range, when the IAB node is allowed to be connected to IAB donor DUs of a plurality of different IAB donors simultaneously, confusion of the IAB node between the two donors needs to be avoided, and in addition, terminal service discontinuity caused by a data packet loss in an IAB topology update process needs to be avoided.

Figure 4:
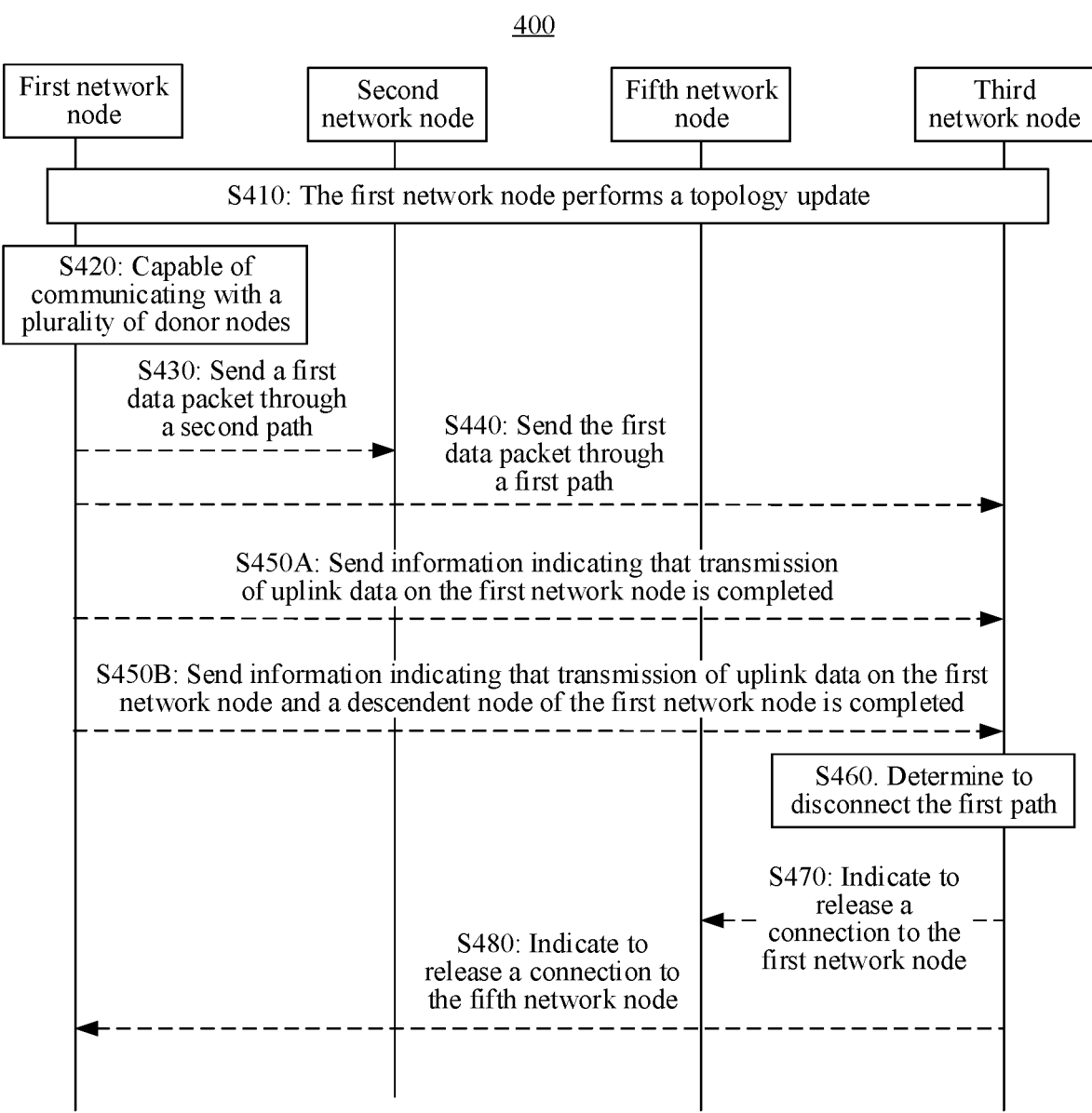
FIG. 4 is a schematic diagram of another lossless data transmission communication method according to an embodiment of this application.

As shown in FIG. 4, to resolve a problem that may occur when an IAB node is capable of communicating with a plurality of donors simultaneously, an embodiment of this application provides a lossless data transmission method 400. The method 400 includes the following steps.

S410: A first network node performs a topology update. The topology update includes that the first network node changes a connected IAB donor DU. For example, the IAB donor DU connected to the first network node is changed to a second network node. The second network node may be referred to as a target IAB donor node DU of the topology update performed by the first network node.

Optionally, before S410, the first network node receives a handover command sent by a third network node.

S420: The first network node is capable of communicating with a plurality of donor nodes. In other words, the first network node has both a path that is for communicating with the third network node (a source IAB donor CU) and which is denoted as an original path or a first path and a path that is for communicating with the second network node (the target IAB donor DU) and which is denoted as a new path or a second path. It is easy to understand that the first network node may also communicate with a target IAB donor CU through the second path.

To avoid confusion of the TAB node between different IAB donor DUs, IAB donor CUs, for example, the third network nodes, a BAP address allocated to the IAB donor DU carries identification information for distinguishing donor CUs. For example, the identification information is an identifier associated with the donor CU.

To avoid a data packet loss problem in an TAB topology update process, the method 400 provides two possible implementations:

Implementation 1:

S430: The first network node sends a first data packet through the second path.

After the first network node sends, to the second network node, the first data packet to be sent to the third network node or a security gateway device on the third network node side, the second network node sends the first data packet to the third network node.

It is easy to understand that, for a specific implementation of step S430, refer to the descriptions in the method 200A.

Implementation 2:

S440: The first network node sends the first data packet through the first path.

Because the first network node has the capability of communicating with the third network node after completing the topology update, the first network node may send the first data packet to the third network node through the first path.

The method 400 further proposes an implementation in which the first network node disconnects the first path. In other words, the first network node may disconnect from the third network node (or a source donor node, or a source parent node). It is easy to understand that, the IAB node can be allowed to disconnect from the source parent node of the IAB node only after the IAB node successfully sends, to the source parent node, uplink data packets on a descendent IAB node of the IAB node and uplink data packets buffered by the IAB node, where the uplink data packets are at a BAP layer and target addresses of the uplink data packets are the third network node, the source donor node, the source parent node, or a source IAB donor DU.

The method 400 further includes the following step:

In a possible manner, after completing transmission of uplink data, the first network node and each IAB node of the descendent IAB nodes of the first network node send first indication information to the third network node, to indicate that the transmission of the uplink data on the IAB node is completed. After receiving the first indication information sent by the first network node and the descendent IAB node of the first network node, the third network node determines that transmission of an uplink data packet that needs to be transmitted by the first network node and the descendent IAB node of the first network node through the first path has been completed. Specifically, the method includes the following steps.

S450A: The first network node sends the first indication information to the third network node. The first indication information indicates that transmission of an uplink data packet of the first network node is completed. Optionally, the first indication information is sent by using an RRC message, or is sent by using an F1AP message.

For ease of description, in this embodiment of this application, it is assumed that the first network node has N descendent IAB nodes, and each of the N descendent IAB nodes sends the first indication information to the third network node after transmission of uplink data is completed. The first indication information indicates that transmission of an uplink data packet of the descendent IAB node is completed, and N is a positive integer.

Correspondingly, the third network node receives the first indication information from the first network node and the N descendent IAB nodes of the first network node. After receiving the N+1 pieces of first indication information, the third network node determines, based on the N+1 pieces of first indication information, that transmission of uplink data packets of the first network node and the descendent node of the first network node is completed. In other words, the third network node determines that the transmission of the uplink data packets that need to be transmitted by the first network node and the descendent IAB node of the first network node through the first path has been completed.

S460: The third network node determines to disconnect the first path.

In another possible manner, after completing the transmission of the uplink data, each of the N descendent IAB nodes of the first network node sends second indication information to the first network node, to indicate that the transmission of the uplink data on the descendent IAB node is completed. After receiving the N pieces of second indication information sent by the N descendent IAB nodes, the first network node determines that transmission of an uplink data packet that needs to be transmitted by the descendent IAB node through the first path has been completed. In addition, after the first network node determines that transmission of uplink data of the first network node has been completed, the first network node sends third indication information to the third network node. The third indication information indicates that transmission of an uplink data packet that needs to be transmitted by the first network node and the descendent IAB node of the first network node through the first path has been completed. Specifically, in this manner, the method 400 includes the following steps.

S450B: The first network node receives the N pieces of second indication information sent by the N descendent IAB nodes. The second indication information has a correspondence with the descendent IAB node, and the first indication information indicates that transmission of uplink data on the descendent IAB node is completed.

After the first network node determines that the transmission of the uplink data of the first network node has been completed, the first network node sends the third indication information to the third network node. The third indication information indicates that the transmission of the uplink data packet that needs to be transmitted by the first network node and the descendent IAB node of the first network node through the first path has been completed.

Correspondingly, the third network node receives the third indication information from the first network node. The third indication information indicates that the transmission of the uplink data packet that needs to be transmitted by the first network node and the descendent IAB node of the first network node through the first path has been completed.

S460: The third network node determines to disconnect the first path.

It is easy to understand that in this embodiment of this application, there are a plurality of possible implementations in which the third network node determines to disconnect the first path in S460.

Manner 1:

S470: The third network node sends fourth indication information to a fifth network node (the source parent node of the first network node). The fourth indication information indicates to stop scheduling the first network node and release a context of the first network node. In other words, the fourth indication information indicates the fifth network node to release a connection to the first network node.

Manner 2:

S480: The third network node sends fifth indication information to the first network node. The fifth indication information indicates the first network node to release a connection to the source parent node. For example, the first network node releases, based on the fifth indication information, a cell served by the source parent node. In other words, the fifth indication information indicates to release a connection to the fifth network node.

It is easy to understand that an execution sequence of the steps in the method 400 is not strictly limited, and to resolve different problems, the execution sequence of the steps may be properly adjusted. In addition, the method 400 provides a plurality of optional manners, and steps corresponding to the manners are also correspondingly optional.

According to the method 400, lossless data transmission of the IAB node in an inter-CU handover scenario can be ensured when the IAB node supports maintaining a plurality of connections to a plurality of donor nodes.

It may be understood that, in the foregoing method embodiments of this application, these steps or operations are merely examples. In embodiments of this application, other operations or variations of various operations may be further performed. In addition, the steps may be performed in a sequence different from a sequence presented in embodiments of this application, and not all the operations in embodiments of this application may be necessarily performed.

The foregoing mainly describes the solutions provided in embodiments of this application from the perspective of interaction between network elements. Correspondingly, an embodiment of this application further provides a communication apparatus, and the communication apparatus is configured to implement the foregoing methods. The communication apparatus may be the network node in the foregoing method embodiments, an apparatus including the foregoing network node, or a component (a chip or a circuit) that can be used in the network node. Alternatively, the communication apparatus may be the terminal device in the foregoing method embodiments, an apparatus including the foregoing terminal device, or a component that can be used in the terminal device. Alternatively, the communication apparatus may be the gateway device in the foregoing method embodiments, or may be a component that can be used in the gateway device. It may be understood that, to implement the foregoing functions, the communication apparatus includes a hardware structure and/or a software module for performing each corresponding function. A person skilled in the art should be easily aware that, with reference to units and algorithm steps in the examples described in embodiments disclosed in this specification, this application can be implemented in a form of hardware or a combination of hardware and computer software. A person skilled in the art may use different methods to implement the described functions for each particular application, but it should not be considered that the implementation goes beyond the scope of this application.

In embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module.

Figure 5:
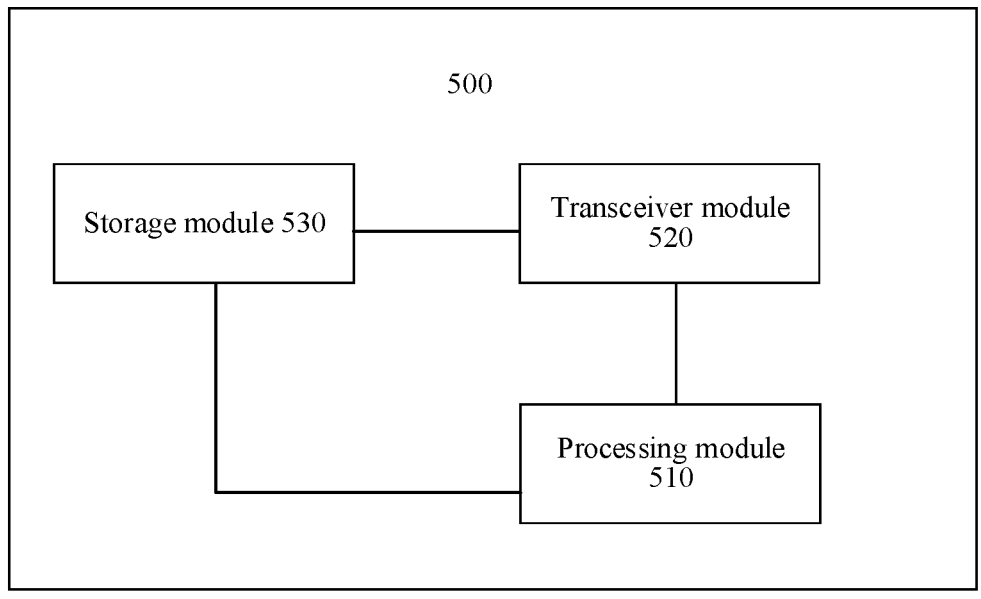
FIG. 5 is a schematic diagram of a lossless data transmission communication apparatus according to an embodiment of this application.

FIG. 5 is a schematic block diagram of a communication apparatus 500 according to an embodiment of this application. The following specifically describes a structure and functions of the communication apparatus 500 with reference to FIG. 5. The communication apparatus 500 may include a processing module 510 (or referred to as a processing unit). Optionally, the communication apparatus 500 may further include a transceiver module 520 (or referred to as a transceiver unit or a communication interface) and a storage module 530 (or referred to as a storage unit).

In a possible design, one or more modules in FIG. 5 may be implemented by one or more processors, may be implemented by one or more processors and one or more memories, may be implemented by one or more processors and one or more transceivers, or may be implemented by one or more processors, one or more memories, and one or more transceivers. This is not limited in this embodiment of this application. The processor, the memory, and the transceiver may be disposed separately, or may be integrated.

Optionally, the modules in the apparatus 500 in this embodiment of this application may be configured to perform the method described in FIG. 2A to FIG. 2C, FIG. 3, or FIG. 4 in embodiments of this application.

In a possible design, the apparatus 500 may include the transceiver module 520 and the processing module 510. The transceiver module 520 is configured to receive a first data packet from a first network node. The second network node is a target donor node distributed unit DU of the first network node. A destination node of the first data packet is a third network node or a security gateway on the third network node side. The third network node is a source donor node or a source donor node central unit CU of the first network node. The transceiver module 520 is further configured to send the first data packet to the third network node.

According to the apparatus, inter-donor DU data packet rerouting and forwarding by an IAB node can be supported. This avoids a data packet loss in a topology update process of the first network node, and reduces impact on uplink service continuity of a terminal served by the first network node.

Optionally, the processing module 510 is configured to update an internet protocol IP address filtering rule to send the first data packet to the third network node.

Optionally, the transceiver module 520 is further configured to obtain a first IP address. The first IP address is one or more IP addresses obtained by the first network node when the first network node is connected to the third network node. Optionally, the processing module 510 is further configured to update the IP address filtering rule based on the first IP address.

Optionally, the processing module 510 is further configured to add the first IP address to a whitelist of a source IP address filtering rule.

Optionally, the transceiver module 520 is further configured to receive the first IP address from the third network node.

Optionally, the transceiver module 520 is further configured to receive the first IP address from a fourth network node.

Optionally, the transceiver module 520 is further configured to receive first suspension indication information from the fourth network node. The first suspension indication information indicates the second network node to suspend the IP address filtering rule.

Optionally, the processing module 510 is further configured to encapsulate the first data packet.

In another possible design, the apparatus 500 may include the transceiver module 520 and the processing module 510. The processing module 510 is configured to determine a first data packet. A destination node of the first data packet is a third network node or a security gateway on the third network node side.

Optionally, the processing module 510 is further configured to update a backhaul adaptation protocol layer configuration of the first data packet to send the first data packet to a second network node.

Optionally, the processing module 510 is further configured to add a second IP header to the first data packet. A target IP address of the second IP header is an IP address of a fourth network node.

Optionally, the transceiver module 520 is further configured to send a first IP address to the fourth network node. The first IP address is one or more IP addresses obtained by a first network node when the first network node is connected to the third network node.

Optionally, the processing module 510 is further configured to perform a topology update.

In another possible design, the apparatus 500 may include the transceiver module 520 and the processing module 510. The processing module 510 is configured to determine a first message. The transceiver module 520 is configured to send the first message to a second network node. The first message is used by the second network node to update an IP address filtering rule. Optionally, the processing module 510 is further configured to obtain a first IP address. The first IP address is one or more IP addresses obtained by a first network node when the first network node is connected to a third network node.

Optionally, the transceiver module 520 is further configured to receive the first IP address from the third network node.

Optionally, the transceiver module 520 is further configured to receive the first IP address from the first network node.

Optionally, the transceiver module 520 is further configured to receive the first IP address from an AMF.

Optionally, the processing module 510 is further configured to determine first suspension indication information. The first suspension indication information indicates the second network node to suspend the IP address filtering rule.

Optionally, the transceiver module 520 is further configured to receive a second data packet from the second network node. The second data packet includes a first IP header and a second IP header. A target IP address of the first IP header is the third network node. A target IP address of the second IP header is an IP address of a fourth network node.

Optionally, the transceiver module 520 is further configured to send a first data packet to the third network node. Optionally, the transceiver module 520 is further configured to receive, from the third network node, data that relates to a terminal device served by the first network node and that is in the first data packet. In another possible design, the apparatus 500 may include the transceiver module 520 and the processing module 510. The transceiver module 520 is configured to obtain a first data packet. The first data packet is a data packet to be sent to a third network node after a first network node is connected to a second network node.

Optionally, the processing module 510 is configured to process the first data packet. Optionally, the transceiver module 520 is further configured to receive the first data packet from a fourth network node.

Optionally, the processing module 510 is further configured to determine, based on the first data packet, data related to a terminal device served by the first network node. Optionally, the transceiver module 520 is further configured to send the data related to the terminal device to the fourth network node. In another possible design, the apparatus 500 may include the transceiver module 520 and the processing module 510. The transceiver module 520 is configured to receive a first handover command from a third network node. Optionally, the transceiver module 520 is further configured to send first transmission completion indication information. The first transmission completion indication information indicates that transmission of a third data packet is completed.

Optionally, the processing module 510 is further configured to determine to perform a topology update.

Optionally, the transceiver module 520 is further configured to send the first transmission completion indication information to a fifth network node. Optionally, the transceiver module 520 is further configured to send the third data packet to the third network node. Optionally, the processing module 510 is further configured to stop uplink scheduling performed on a sixth network node.

In another possible design, the apparatus 500 may include the transceiver module 520 and the processing module 510. The transceiver module 520 is configured to receive transmission indication information indicating to stop uplink scheduling for a first network node. The processing module 510 is configured to determine, based on the transmission indication information, to stop the uplink scheduling for the first network node. Optionally, the transceiver module 520 is further configured to receive first transmission completion indication information from the first network node.

Optionally, the transceiver module 520 is further configured to receive second scheduling stop indication information from a third network node.

In another possible design, the apparatus 500 may include the transceiver module 520 and the processing module 510. The transceiver module 520 is configured to receive first transmission completion indication information from a first network node. The transceiver module 520 is further configured to send second scheduling stop indication information to a fifth network node.

Figure 6:
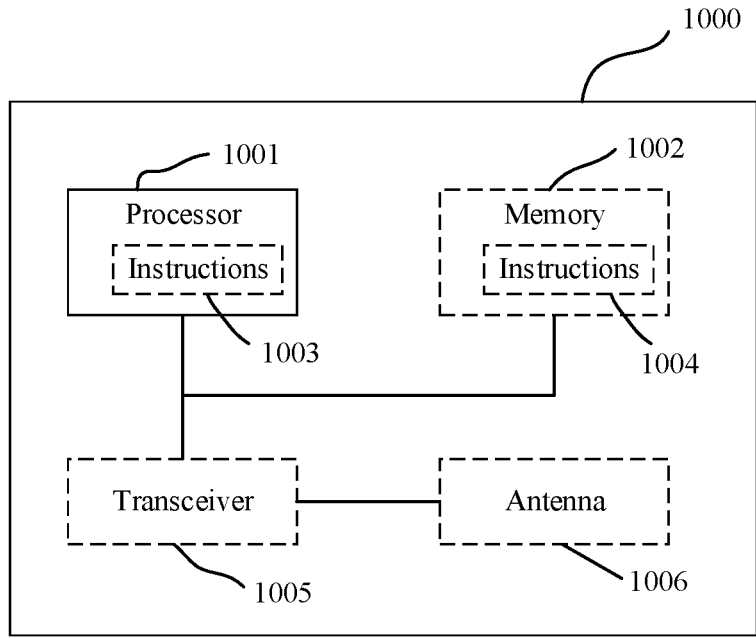
FIG. 6 is a schematic diagram of a structure of a lossless data transmission communication apparatus according to an embodiment of this application.

FIG. 6 is a schematic diagram of a structure of an apparatus. The apparatus 600 may be a network device, a terminal device, a server, or a centralized controller, or may be a chip, a chip system, a processor, or the like that supports the network device, the terminal device, the server, or the centralized controller in implementing the foregoing methods. The apparatus may be configured to implement the methods described in the foregoing method embodiments. For details, refer to the descriptions in the foregoing method embodiments.

The apparatus 600 may include one or more processors 610. The processor 610 may also be referred to as a processing unit, and may implement a specific control function. The processor 610 may be a general-purpose processor, a dedicated processor, or the like. For example, the processor 610 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an optional design, the processor 610 may alternatively store instructions and/or data 630, and the instructions and/or data 630 may be run by the processor, to enable the apparatus 600 to perform the methods in the foregoing method embodiments.

In another optional design, the processor 610 may include a transceiver unit configured to implement receiving and sending functions. For example, the transceiver unit may be a transceiver circuit, an interface, an interface circuit, or a communication interface. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, the apparatus 600 may include a circuit. The circuit may implement the sending, receiving, or communication function in the foregoing method embodiments.

Optionally, the apparatus 600 may include one or more memories 620. The memory may store instructions 640. The instructions may be run on the processor, to enable the apparatus 600 to perform the methods in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the apparatus 600 may further include a transceiver 650 and/or an antenna 660. The processor 610 may be referred to as a processing unit, and control the apparatus 600. The transceiver 650 may be referred to as a transceiver unit, a transceiver machine, a transceiver circuit, a transceiver apparatus, a transceiver module, or the like, and is configured to implement receiving and sending functions.

Optionally, the apparatus 600 in this embodiment of this application may be configured to perform the method described in FIG. 2A to FIG. 2C, FIG. 3, or FIG. 4 in embodiments of this application.

The processor and the transceiver described in this application may be implemented in an integrated circuit (integrated circuit, IC), an analog IC, a radio frequency integrated circuit RFIC, a mixed signal IC, an application-specific integrated circuit (application-specific integrated circuit, ASIC), a printed circuit board (printed circuit board, PCB), an electronic device, or the like. The processor and the transceiver may also be manufactured by using various IC technologies, for example, a complementary metal oxide semiconductor (complementary metal oxide semiconductor, CMOS), an N-type metal oxide semiconductor (nMetal-oxide-semiconductor, NMOS), a P-type metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

The apparatus described in the foregoing embodiment may be the network device or the terminal device. However, a range of the apparatus described in this application is not limited thereto, and the structure of the apparatus may not be limited to FIG. 6. The apparatus may be an independent device, or may be a part of a larger device. For example, the apparatus may be:

(1) an independent integrated circuit IC, a chip, or a chip system or subsystem;

(2) a set of one or more ICs, where optionally, the IC set may also include a storage component configured to store data and/or instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or (6) others.

A person of ordinary skill in the art may understand that, for the purpose of convenient and brief description, for a detailed working process of the foregoing system, apparatus, and unit, refer to a corresponding process in the foregoing method embodiments. Details are not described herein again.

It may be understood that the system, apparatus, and method described in this application may alternatively be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium such as a USB flash drive, a removable hard disk, a read-only memory (read-only memory, ROM), a random access memory (random access memory, RAM), a magnetic disk, or an optical disc, that can store program code.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

A person skilled in the art may further understand that various illustrative logical blocks (illustrative logical blocks) and steps (steps) that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the functions for corresponding application, but it should not be considered that the implementation goes beyond the scope of embodiments of this application.

It may be understood that, the processor in embodiments of this application may be an integrated circuit chip, and has a signal processing capability. In an implementation process, the steps in the foregoing method embodiments may be implemented by using a hardware integrated logical circuit in the processor or instructions in a form of software. The foregoing processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component.

The solutions described in this application may be implemented in various manners. For example, the technologies may be implemented by using hardware, software, or a combination thereof. For hardware implementation, a processing unit configured to perform these technologies at a communication apparatus (for example, a base station, a terminal, a network entity, or a chip) may be implemented in one or more general-purpose processors, a DSP, a digital signal processor, an ASIC, a programmable logic device, an FPGA or another programmable logic apparatus, a discrete gate or transistor logic device, a discrete hardware component, or any combination thereof. The general-processor may be a microprocessor. Optionally, the general-processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

It may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example, and not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). Notably, the memory in the system and the methods described in this specification is intended to include, but not limited to, these memories and any memory of another proper type.

This application further provides a computer-readable medium storing a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid state disk (solid state disk, SSD)), or the like.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments by using any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It can be understood that, in this application, "when" and "if" mean that an apparatus performs corresponding processing in an objective situation, and are not intended to limit time. The terms do not mean that the apparatus is required to have a determining action during implementation, and do not mean any other limitation.

"Simultaneously" in this application may be understood as being at a same time point, may be understood as being within a time period, or may be understood as being within a same periodicity.

A person skilled in the art may understand that various numbers such as first and second in this application are merely used for differentiation for ease of description, and are not used to limit the scope of embodiments of this application. A specific value of a number (which may also be referred to as an index), a specific value of a quantity, and a position in this application are merely used as examples, but are not unique representation forms, and are not used to limit the scope of embodiments of this application. Various numbers such as first and second in this application are merely used for differentiation for ease of description, and are not used to limit the scope of embodiments of this application.

In this application, an element represented in a singular form is intended to represent "one or more", but does not represent "one and only one", unless otherwise specified. In this application, unless otherwise specified, "at least one" is intended to represent "one or more", and "a plurality of" is intended to represent "two or more".

In addition, the terms "system" and "network" may be used interchangeably in this specification. The term "at least one of" in this specification indicates all combinations or any combination of listed items. For example, "at least one of A, B, and C" may indicate the following six cases: only A exists, only B exists, only C exists, A and B coexist, B and C coexist, and A, B, and C coexist. A may be singular or plural, B may be singular or plural, and C may be singular or plural.

It can be understood that in embodiments of this application, "B corresponding to A" represents that B is associated with A, and B may be determined based on A. However, it should be further understood that determining B based on A does not mean that B is determined based only on A. B may alternatively be determined based on A and/or other information.

A person of ordinary skill in the art may understand that units and algorithm steps in the examples described with reference to embodiments disclosed in this specification can be implemented by electronic hardware or a combination of computer software and electronic hardware. Whether functions are performed in a hardware or software manner depends on particular applications and design constraint conditions of the technical solutions. A person skilled in the art may use different methods to implement the described functions for each particular application, but it should not be considered that the implementation goes beyond the scope of this application.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing implementations of this application are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

The invention claimed is:

1. A communication apparatus, comprising:
at least one processor, and
at least one memory storing instructions for execution by the at least one processor;
wherein, when executed, the instructions cause the communication apparatus to perform operations comprising:
receiving a first data packet from a first network node, wherein the communication apparatus is a target donor node distributed unit (DU) of the first network node or a chip of the target donor node DU, a destination node of the first data packet is a third network node, and the third network node is a source donor node of the first network node;
obtaining a first internet protocol (IP) address, wherein the first IP address is at least one IP address of the first network node when the first network node is connected to the third network node; and
sending the first data packet to the third network node based on the first IP address.

2. The communication apparatus according to claim 1, wherein the operations further comprise:
updating an IP address filtering rule based on the first IP address,
wherein the sending the first data packet to the third network node based on the first IP address comprises:
sending the first data packet to the third network node based on the IP address filtering rule.

3. The communication apparatus according to claim 1, wherein the operations further comprise:

adding the first IP address to a list of source IP addresses of data packets that are allowed to be forwarded by the target donor node DU of the first network node.

4. The communication apparatus according to claim 1, wherein the operations further comprise:

receiving the first IP address from a fourth network node, wherein the fourth network node is a target donor central unit (CU) of the first network node.

5. The communication apparatus according to claim 1, wherein the first network node completes a topology update before the communication apparatus receives the first data packet from the first network node.

6. The communication apparatus according to claim 5, wherein the first network node completes a topology update comprises: the first network node changes a connected donor DU.

7. A communication apparatus, comprising:

at least one processor; and at least one memory storing instructions for execution by the at least one processor;

wherein, when executed, the instructions cause the communication apparatus to perform operations comprising:

obtaining a first IP address, wherein the first IP address is at least one IP address of a first network node when the first network node is connected to a third network node, and the third network node is a source donor node of the first network node, and wherein the communication apparatus is a target donor node central unit (CU) of the first network node or a chip of the target donor node CU; and sending the first IP address to a second network node, wherein the first IP address is of a first data packet, a destination node of the first data packet is the third network node and the second network node is a target donor node distributed unit (DU) of the first network node.

8. The communication apparatus according to claim 7, wherein the operations further comprise:

receiving the first IP address from the third network node.

9. The communication apparatus according to claim 7, wherein the operations further comprise:

receiving, from the third network node, the first data packet that relates to a terminal device served by the first network node.

10. The communication apparatus according to claim 7, wherein the first IP address is in a list of source IP addresses of data packets that are allowed to be forwarded by the second network node.

11. A communication system, comprising:

a second network node; and a fourth network node, wherein:

the second network node is configured to perform operations comprising:

receiving a first data packet from a first network node, wherein the second network node is a target donor node distributed unit (DU) of the first network node, a destination node of the first data packet is a third network node, and the third network node is a source donor node of the first network node;

obtaining a first IP address, wherein the first IP address is at least one IP address of the first network node when the first network node is connected to the third network node; and sending the first data packet to the third network node based on the first IP address;

the fourth network node is configured to perform operations comprising:

obtaining the first IP address, wherein the fourth network node is a target donor node central unit (CU) of a first network node; and sending the first IP address to the second network node, and the second network node is a target donor node DU of the first network node.

12. The communication system according to claim 11, wherein the second network node is configured to perform operations comprising:

updating an IP address filtering rule based on the first IP address, wherein the sending the first data packet to the third network node based on the first IP address comprises:

sending the first data packet to the third network node based on the IP address filtering rule.

13. The communication system according to claim 11, wherein the second network node is configured to perform operations comprising:

adding the first IP address to a list of source IP addresses of data packets that are allowed to be forwarded by the target donor node DU of the first network node.

14. The communication system according to claim 11, wherein the second network node is configured to perform operations comprising:

receiving the first IP address from the fourth network node, wherein the fourth network node is a target donor CU of the first network node.

15. The communication system according to claim 11, wherein the first network node completes a topology update before the second network node receives the first data packet from the first network node.

16. The communication system according to claim 15, wherein the first network node completes a topology update comprises: the first network node changes a connected donor DU.

17. The communication system according to claim 11, wherein the fourth network node is configured to perform operations comprising:

receiving the first IP address from the third network node.

18. The communication system according to claim 11, wherein the fourth network node is configured to perform operations comprising:

receiving, from the third network node, the first data packet that relates to a terminal device served by the first network node.

19. The communication apparatus according to claim 1, wherein the sending the first data packet to the third network node based on the first IP address comprises:

sending the first data packet to the third network node based on an updated IP address filtering rule, wherein the updated IP address filtering rule indicates that the first IP address is in a list of source IP addresses of data packets that are allowed to be forwarded by the target donor node DU of the first network node.

20. The communication system according to claim 11, wherein the sending the first data packet to the third network node based on the first IP address comprises:

sending the first data packet to the third network node based on an updated IP address filtering rule, wherein the updated IP address filtering rule indicates that the first IP address is in a list of source IP addresses of data packets that are allowed to be forwarded by the target donor node DU of the first network node.

* * * * *